United States Patent
Gore et al.

(10) Patent No.: US 11,734,631 B2
(45) Date of Patent: *Aug. 22, 2023

(54) FILTERING RECORDS ON A UNIFIED DISPLAY

(71) Applicant: MICROSOFT TECHNOLOGY LICENSING, LLC, Redmond, WA (US)

(72) Inventors: Abhijit Nemichand Gore, Redmond, WA (US); Monil Dalal, Hyderabad (IN); Ashish Kothari, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/210,772

(22) Filed: Mar. 24, 2021

(65) Prior Publication Data

US 2021/0209530 A1    Jul. 8, 2021

Related U.S. Application Data

(63) Continuation of application No. 14/337,781, filed on Jul. 22, 2014, now Pat. No. 10,990,914.

(51) Int. Cl.
| | |
|---|---|
| *G06Q 10/0633* | (2023.01) |
| *G06F 3/04842* | (2022.01) |
| *G06F 16/904* | (2019.01) |
| *H04L 51/56* | (2022.01) |
| *H04L 51/216* | (2022.01) |

(52) U.S. Cl.
CPC ..... *G06Q 10/0633* (2013.01); *G06F 3/04842* (2013.01); *G06F 16/904* (2019.01); *H04L 51/216* (2022.05); *H04L 51/56* (2022.05)

(58) Field of Classification Search
None
See application file for complete search history.

(56) References Cited

U.S. PATENT DOCUMENTS

| | | | |
|---|---|---|---|
| 7,139,800 B2 * | 11/2006 | Bellotti | G06Q 10/107 709/217 |
| 7,328,242 B1 * | 2/2008 | McCarthy | G06Q 10/10 709/204 |
| 9,800,525 B1 * | 10/2017 | Lerner | H04L 51/56 |
| 2006/0168553 A1 * | 7/2006 | Drennan | H04L 63/0442 717/100 |
| 2009/0144374 A1 * | 6/2009 | Laborde | H04L 51/212 709/206 |
| 2010/0191836 A1 * | 7/2010 | Knight | H04M 3/436 709/220 |

(Continued)

OTHER PUBLICATIONS

J. . -M. S. Wams and M. van Steen, "Unifying user-to-user messaging systems," in IEEE Internet Computing, vol. 8, No. 2, pp. 76-82, Mar.-Apr. 2004, doi: 10.1109/MIC.2004.1273489. (Year: 2004).*

*Primary Examiner* — Mehmet Yesildag
(74) *Attorney, Agent, or Firm* — Christopher J. Volkmann; Kelly, Holt & Christenson, PLLC

(57) ABSTRACT

An activity thread is displayed with display elements that represent different activities that correspond to a common identifier. The display includes filter user input mechanisms that are actuated to filter the display elements based on filter criteria.

20 Claims, 19 Drawing Sheets

(56) References Cited

U.S. PATENT DOCUMENTS

| | | | |
|---|---|---|---|
| 2011/0119593 A1* | 5/2011 | Jacobson | H04L 51/18 |
| | | | 715/736 |
| 2012/0144313 A1* | 6/2012 | Park | G06F 16/2428 |
| | | | 715/747 |
| 2013/0097526 A1* | 4/2013 | Stovicek | G06Q 10/107 |
| | | | 715/752 |
| 2013/0204888 A1* | 8/2013 | Guzman Suarez | |
| | | | G06F 16/90344 |
| | | | 707/758 |
| 2013/0204947 A1* | 8/2013 | Guzman Suarez | |
| | | | G06F 16/90344 |
| | | | 709/206 |
| 2013/0262168 A1* | 10/2013 | Makanawala | G06Q 30/016 |
| | | | 705/7.14 |
| 2014/0344711 A1* | 11/2014 | Hallerstrom Sjostedt | |
| | | | H04L 51/234 |
| | | | 715/752 |

* cited by examiner

FILTERING RECORDS ON A UNIFIED DISPLAY

CROSS-REFERENCE TO RELATED APPLICATION

The present application is a continuation of and claims priority of U.S. patent application Ser. No. 14/337,781, filed Jul. 22, 2014, the content of which is hereby incorporated by reference in its entirety.

BACKGROUND

Computer systems are in wide use. Some computer systems receive interactions by users over a variety of different types of communication channels.

Some such computer systems include business systems. Business systems can include, for instance, customer relations management (CRM) systems, enterprise resource planning (ERP) systems, line-of-business (LOB) systems, among others.

In CRM systems, for instance, users of the CRM system often assist customers with various problems. Such users are sometimes referred to as customer service representatives. They perform customer service operations for a company that has implemented a CRM system.

In doing so, the customer service representative often receives communications from customers over multiple different channels, even for a single issue that the customer has raised. By way of example, a customer may send an e-mail to the company describing a problem with a product that the customer purchased from the company. The e-mail may illustratively be received at the CRM system where it is routed to a customer service representative. The customer service representative may then reply to the e-mail or schedule an appointment to talk to the customer, for instance. The customer may then call the customer service representative at the appointed time. The customer service representative may do other things as well, such as assign tasks (e.g., to a sales engineer) in order to address the issue raised by the customer. The customer service representative may also consult with colleagues in order to attempt to address the issue. At a later time, the customer service representative may send a text message to the customer scheduling another time to talk to the customer, as a follow up.

It can thus be seen that, even for a single customer service issue raised by a single customer, a customer service representative may communicate with the customer using a variety of different communication channels (such as e-mail, telephone, messaging, etc.) and the customer service representative may perform a variety of other activities related to the issue raised by the customer (such as consult with colleagues, post notes related to the issue, assign internal tasks, etc.).

In some CRM systems, in order to view all of this information, a customer service representative may need to navigate to different parts of the CRM system. For instance, in order to view e-mails related to this customer's issue, the customer service representative may need to navigate to the e-mail system. In order to view tasks or appointments, the customer service representative may need to navigate to the calendar or task management portion of the CRM system. In order to make a telephone call to the customer, the customer service representative may need to navigate to even a different portion of the CRM system. This can be cumbersome.

The discussion above is merely provided for general background information and is not intended to be used as an aid in determining the scope of the claimed subject matter.

SUMMARY

An activity thread is displayed with display elements that represent different activities that correspond to a common identifier. The display includes filter user input mechanisms that are actuated to filter the display elements based on filter criteria.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
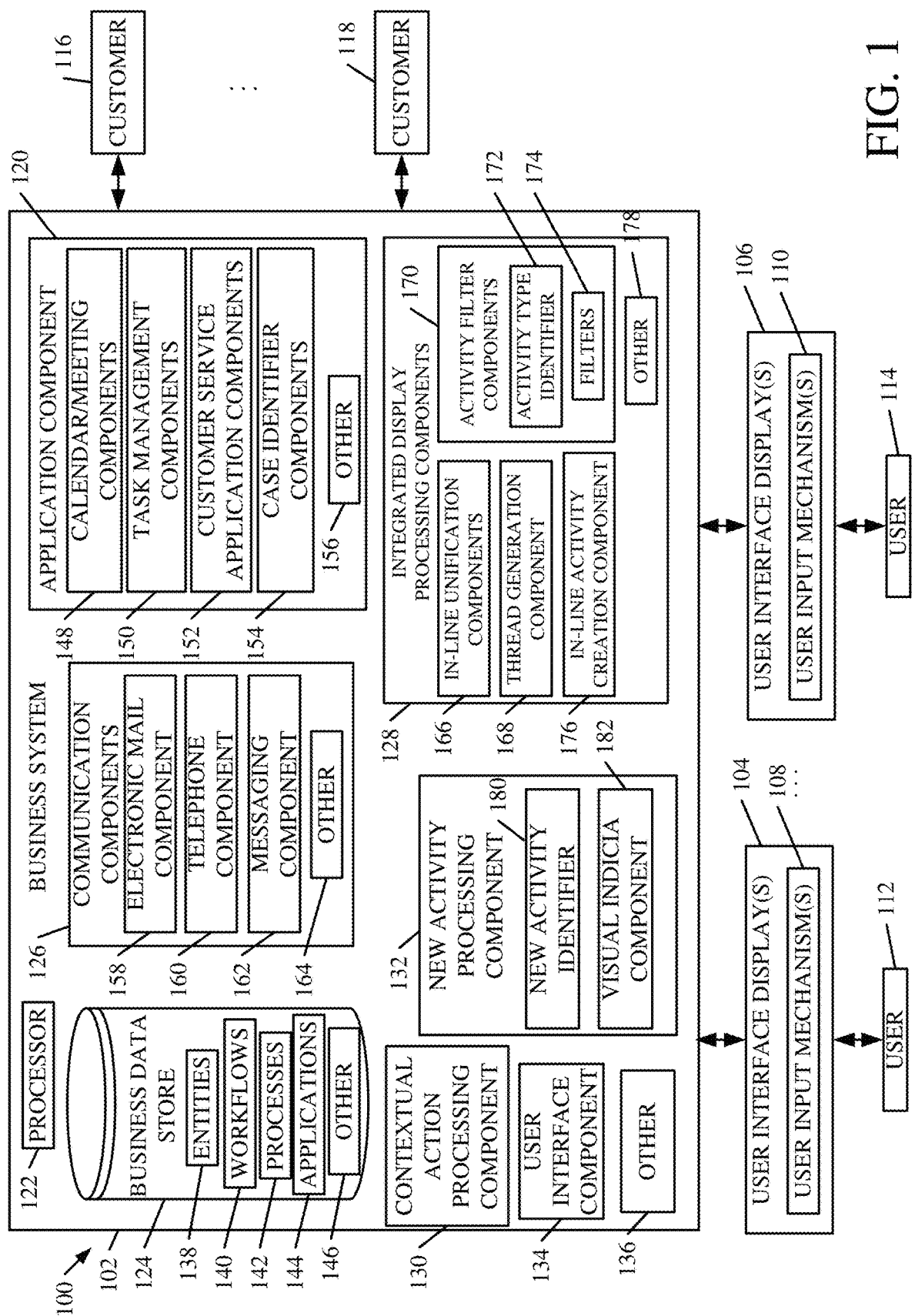
FIG. 1 is a block diagram of one example of a business system architecture.

FIG. 1 is a block diagram of one example of a business system architecture 100. Architecture 100 illustratively includes business system 102 that generates user interface displays 104-106 with user input mechanisms 108-110 for interaction by users 112-114. In the example shown in FIG. 1, business system 102 is illustratively a customer relations management (CRM) system. Therefore, customers 116-118 illustratively communicate with users 112-114 (who may be customer service representatives) through business system 102. Users 112-114 then interact with user input mechanisms 108-110 on user interface displays 104-106 in order to manipulate and control business system 102 to address the needs or issues of customers 116-118.

It will be appreciated that, while the present discussion proceeds with respect to business system 102 being a CRM system, it could be other business systems (such as an ERP system, an LOB system, among others) or other computer systems as well. For instance, it can be any other computer system that receives inputs through a variety of different communication channels and generates a unified view of those communications, corresponding to records in the business system. However, for the sake of the present example, the present discussion will proceed with respect to system 102 being a CRM system.

Thus, business system 102 illustratively includes application components 120, processor 122, business data store 124, communication components 126, integrated display processing components 128, contextual action processing component 130, new activity processing component 132, user interface component 134, and it can include other items 136 as well.

Before describing the overall operation of business system 102 in more detail, a brief description of some of the items in business system 102 will first be provided. Business data store 124 illustratively stores entities 138, workflows 140, processes 142, applications 144, and it can include other items 146. Entities 138 are illustratively business records that describe and define business entities within system 102. Therefore, for instance, a customer entity describes and defines a customer. A vendor entity describes and defines a vendor. A product entity describes and defines a product. A customer service issue entity describes and defines a customer service issue. The entities can be objects which have callable methods. They can also include more rich functionality than an object. They can include a wide variety of other business records as well.

Application components 120 illustratively include items that run applications 144, which, themselves, can use workflows 140 and processes 142 to operate on business data represented by entities 138 and other business records 146. Therefore, application components 120 can include calendar/meeting components 148, task management components 150, customer service application components 152, case identifier components 154, and they can include other components 156.

Calendar/meeting components 148 illustratively run calendar or meeting applications that can be used to make appointments, schedule meetings, send meeting requests, etc. Task management components 150 illustratively include one or more applications that allow users 112-114 to assign tasks, and to follow those tasks as they are performed, completed, etc. Customer service application components 152 illustratively run one or more customer service applications that can be accessed by users 112-114 in order to perform customer service operations for the company that has implemented business system 102. Therefore, they illustratively allow users 112-114 to track customer service issues, and to view information corresponding to those different issues. Case identifier component 154 includes one or more applications that receive activity inputs from customers or users and assign a case identifier to those activities. For instance, the first time a customer 116 contacts the company that uses business system 102, case identifier component 154 may assign a case number to that customer service call. This is illustratively a unique identifier within business system 102 that will be used to identify information and activities corresponding to the customer service issue raised by the customer service call. Other identifiers can be used as well, such as a customer account identifier, a social security number, an email address, etc.

Communication components 126 illustratively include applications or other components that facilitate communication between business system 102 and users 112-114, as well as customers 116-118. Therefore, in one example, communication components 126 illustratively include electronic mail components 158 that facilitate electronic mail communication not only internally among users 112-114, but externally between users 112-114 and customers 116-118. Telephone component 160 facilitates telephone communication among users 112-114 and customers 116-118. Messaging component 162 illustratively includes applications or other components that facilitate messaging (such as text messaging or other SMS messaging, or messaging using other types of messaging systems). The messaging can be facilitated between users 112-114 and customers 116-118. Communication components 126 can include other applications or components 164 as well, that facilitate other types of communication. This can include electronic and other mediums, such as telephone, facsimile, etc.

Integrated display processing components 128 include functionality that generates a unified display for users 112-114, corresponding to any given case number. Component 128 can also include other items 178 as well. In-line unification components 166 identify communications or other activities, of different types, that correspond to the same case number, and generate display elements corresponding to each identified activity. Components 166 then generate a unified display of those activities for a user 112-114. As is described below, each of the display elements is a record corresponding to some type of activity or activity input that corresponds to the case number. The activity or activity input can be a communication (internal or external), a task, a note, a meeting, etc. Thread generation component 168 places those display elements (or activities) in a unified thread, such as in chronological order or in reverse chronological order, so that a user accessing that case number can see the order in which the activities appeared. Activity filter components 170 provide user input mechanisms that allow a user to filter the activities displayed on the unified display. They can include, for instance, an activity type identifier 172 that identifies the different types of activities in the unified display, and filters 174 that filter those activities based on activity type, based on a source (such as external vs. internal activities), based on sensitivity (such as confidential or public), date, other system status (such as order status), etc. In-line activity creation component 176 generates user input mechanisms that can be actuated by a user in order to create in-line activities corresponding to the case number. This can be done without leaving the context of the business records (or case number) currently being viewed.

Contextual action processing component 130 illustratively allows a user to take contextual actions from selected activities within the unified display. For instance, if the unified display includes an e-mail message, a user viewing the unified display can select the e-mail message and take contextual actions that are related to the e-mail message. By way of example, the user can reply, reply all, attach attachments, etc. Again, this is done in-line, without losing the context of the business record represented by the unified display.

New activity processing component 132 illustratively includes new activity identifier 180 and visual indicia component 182. New activity identifier 180 identifies activities that are new to the particular user 112-114 that is viewing the unified display. Visual indicia component 182 adds visual indicia to identify the new activities on the unified display, so that the user can easily see those particular activities that are new, since the last time the user accessed the unified display for this case number (or business record).

Figure 2:
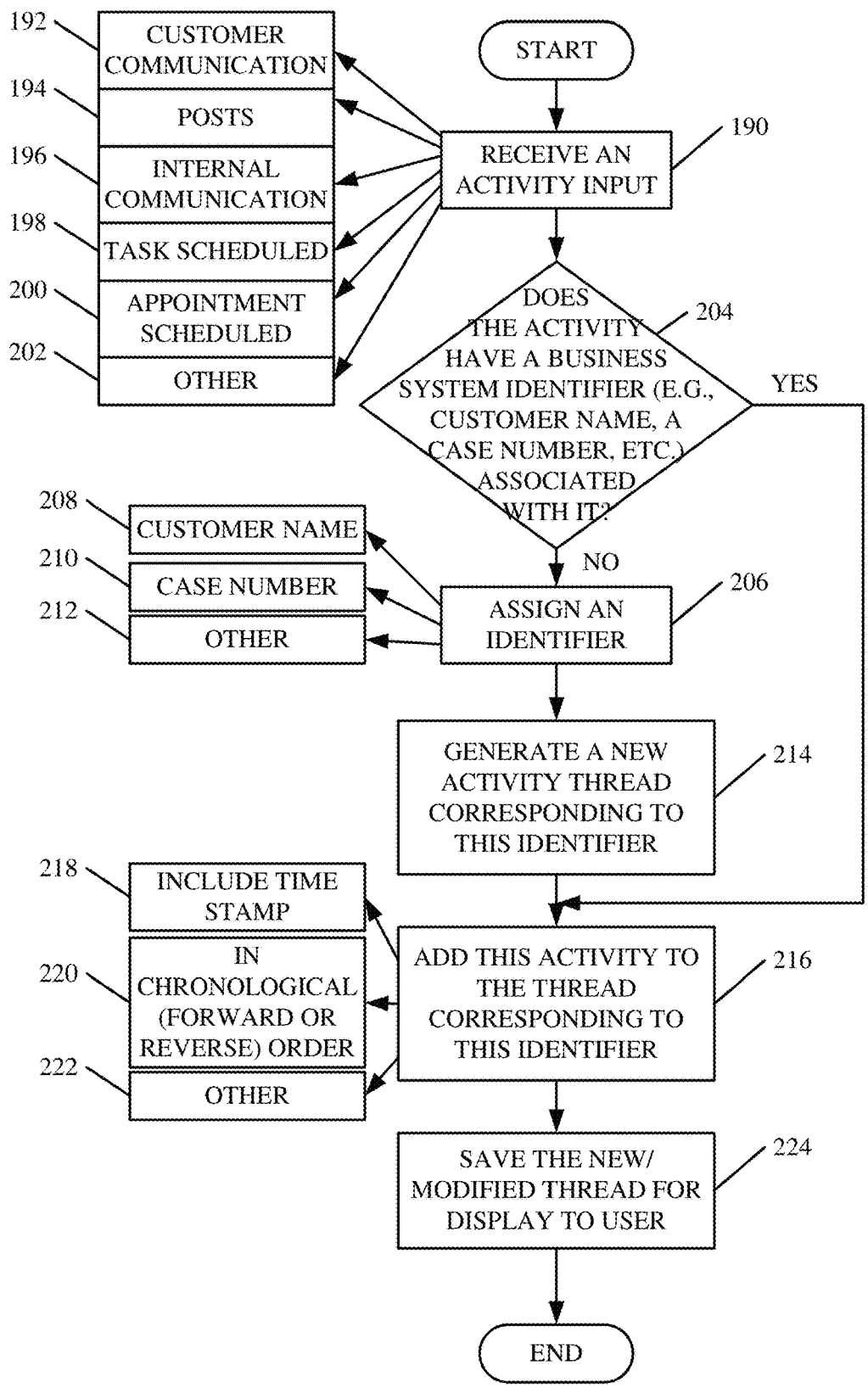
FIG. 2 is a flow diagram illustrating one example of the operation of the architecture shown in FIG. 1 in generating a unified activity thread.

FIG. 2 is a flow diagram illustrating one example of the operation of architecture 100, in more detail, in generating a unified display or unified thread of activities for a given business record or case number. Business system 102 first receives an activity input from a customer 116-118 or from a user 112-114. This is indicated by block 190 in FIG. 2. For instance, the activity input can be a communication from a customer (such as customer 116). It can be an e-mail communication, a telephonic communication, a messaging communication, or a wide variety of other communications. This is indicated by block 192. The activity input can be a post from one of internal users 112-114. This is indicated by block 194. It can be another type of internal communication, such as an e-mail from user 112 to user 114, a phone call between the users, a message between the users, etc. Internal communication is indicated by block 196. The activity input can be a task by one of users 112-114. For instance, it may be that the user has scheduled a customer service call to be performed for customer 116. This can be input by the user into business system 102 through task management components 150. A scheduled task is indicated by block 198. It can be another type of scheduled appointment (such as a conference call, etc.). This is indicated by block 200. It can be a wide variety of other activity inputs as well, and this is indicated by block 202.

Case identifier component 154 then determines whether the activity input has a business system identifier associated with it. This is indicated by block 204. By way of example, if customer 116 previously called user 112, user 112 may have a case number assigned to the issue raised by that customer. The identifier can be the customer name, a unique number assigned to the issue, or a wide variety of other identifiers. In that case, the customer number or other case identifier will be on subsequent activity inputs. In any case, case identifier component 154 determines whether the activity input has a business system identifier associated with it. If so, then processing skips to block 216 which is described in greater detail below. If not, however, then the current activity is processed as if it were the first activity corresponding to this issue. Thus, case identifier component 154 assigns an identifier to the activity. This is indicated by block 206 in FIG. 2. For instance, the identifier can be the customer name 208, it can be a case number 210, or it can be a wide variety of other identifiers 212.

Thread generation component 168 then generates a new activity thread corresponding to this identifier. This is indicated by block 214 in FIG. 2. It then adds this activity to the thread corresponding to this identifier. This is indicated by block 216. In one embodiment, the activity that has just been received is added to the activity thread by linking it within data store 124 through the identifier. Thus, all stored activities having this identifier become part of a common thread.

The activity information that is stored can include a timestamp 218 that identifies a time when the record corresponding to the activity input was created. For instance, if the activity input is an e-mail from a customer, then the activity can be added to the thread for the case identifier by including not only the e-mail content but a timestamp indicating when the e-mail was received (or sent). Thread generation component 168 can arrange the activities in any given thread in chronological order. For instance, where there are multiple items in a thread, they can be arranged in reverse chronological order (where the more recent items are placed at the top of the thread), or in forward chronological order (where the oldest activities in the thread are placed at the top of the thread). Arranging the activities in the thread in chronological order is indicated by block 220. Of course, the items can be arranged or placed in a thread in other ways as well, and this is indicated by block 222.

Figure 2A:
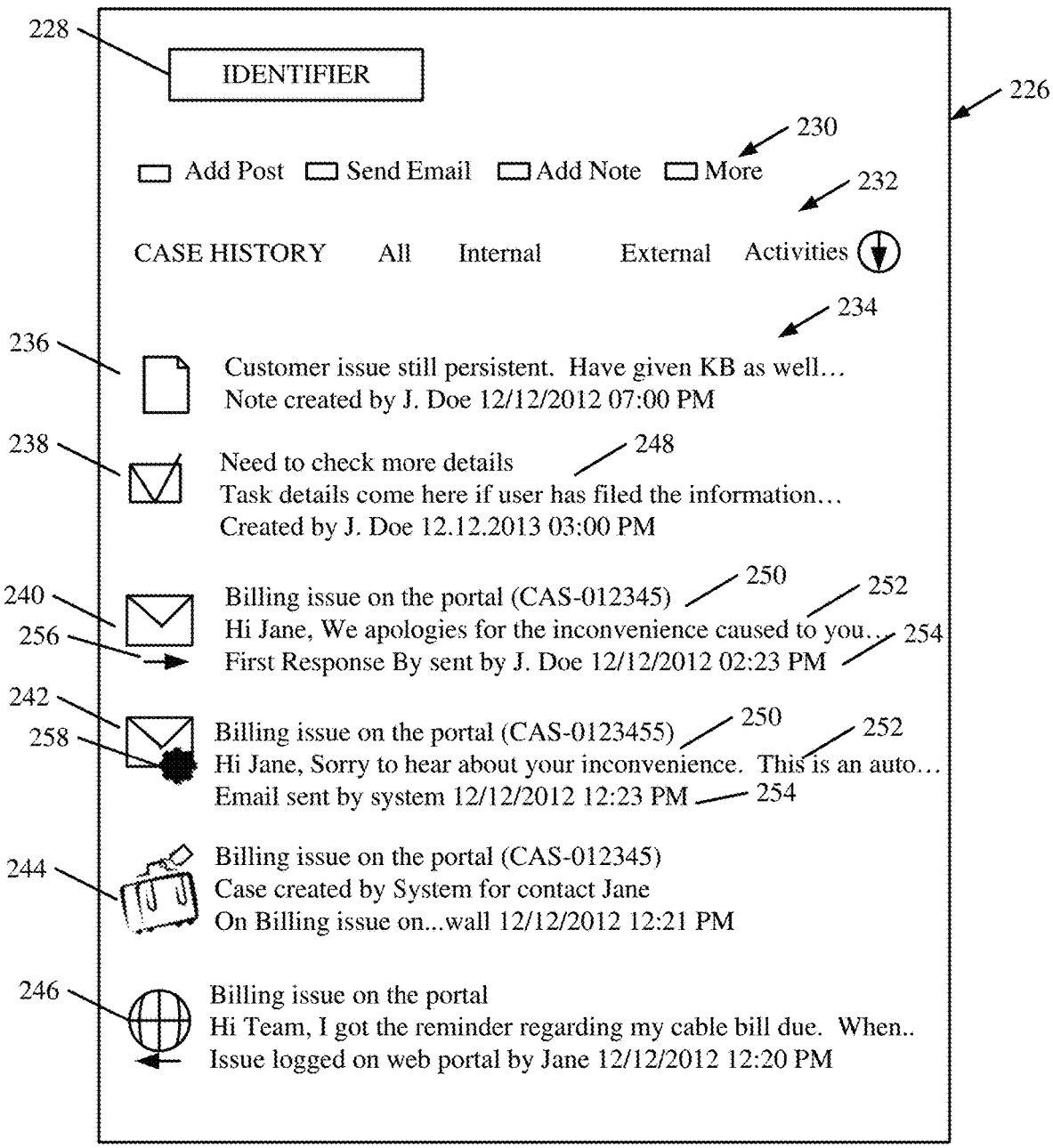
FIG. 2A shows one example of a user interface display.

Thread generation component 168 then saves the new or modified thread for later access or display to a user 112-114. This is indicated by block 224 in FIG. 2. FIG. 2A shows one example of a user interface display 226 that illustrates a unified display (of activities in a unified thread). The unified display may illustratively include an identifier section 228 that shows the identifier for this particular case or issue. Displaying the identifier may not be used as well. For instance, if the activity list is displayed on a form that already includes a case number, then it need not be displayed again. The unified display also includes an activity generation section 230 that allows a user to generate activities from display 226. This is described in greater detail below with respect to FIGS. 6-6C. Display 226 also illustratively includes a filter section 232 that has user input mechanisms that allow the user viewing display 226 to filter the various activities within the unified thread. This is described in greater detail below with respect to FIGS. 4 and 4A.

Display 226 also illustratively includes unified thread section 234. Section 234 illustratively includes a unified set of activities that have been received or performed with respect to this case number (identified by identifier 228) in some order determined by thread generation component 168. In the example shown in FIG. 2A, the activities are arranged in reverse chronological order.

It can be seen that in unified thread section 234, each activity is represented by a display element 236-246. The activities represent a variety of different types of activities that can be received or generated through a variety of different channels. For instance, display element 236 represents a note activity. The note activity is a note that was posted by a given user 112-114 for this case number. Display element 238 corresponds to a task that was created by a user 112-114 within business system 102. It includes a details actuator 248 that allows the user to be navigated to more details corresponding to the task that is represented by display element 238.

Display element 240 represents an e-mail activity. It briefly describes the issue regarding the e-mail at 250. It can include a textual portion 252 that includes a portion of the e-mail, and it includes identifying information 254 that identifies the sender of the e-mail and when it was sent. It can include other items as well. In the example shown, the case number is illustrated in the information 250. It can be seen that display element 240 represents an external e-mail from one of users 112-114 to a customer. This is indicated by a designator 256.

Display element 242 corresponds to an external e-mail that was sent by the system and received by a user 112-114 within business system 102. It includes similar information to that shown with respect to display element 240, and it is similarly numbered. However, it also indicates, by designator 258, that this is system e-mail that was automatically sent by the system, instead of a live user.

Element 244 indicates that a case was created and an identifier was assigned, because a customer 116-118 (in this case Abby H.) posted an issue on a social media network of the company using business system 102. Based on that input, case identifier component 154 identified the activity as one which did not yet have an identifier 228, and therefore it created a business record for the activity and assigned it an identifier.

Display element 246 is a wall post display element that represents an activity by which the customer posted a message on the social media wall of the business using system 102. It contains the contents of that post and also identifies who it was posted by and the date and time when it was posted.

It can thus be seen with respect to FIG. 2A that in-line unification component 166 identified all of the activities as belonging to the same case identifier, and thread generation component 168 arranged display elements corresponding to each of those activities in a thread where the activities are arranged in reverse chronological order. This provides a number of significant advantages. First, it reduces the processing load on business system 102, by users 112-114. Instead of the users needing to switch back and forth between the various systems in business system 102, all of the information is surfaced in the unified display 226. This also allows system 102 to surface the relevant information more quickly, thus further reducing the processing overhead for presenting the information on the unified display 226. Additional benefits can include increased productivity of the user (e.g., the customer service representative), and faster resolution of issues for the customer.

Figure 3:
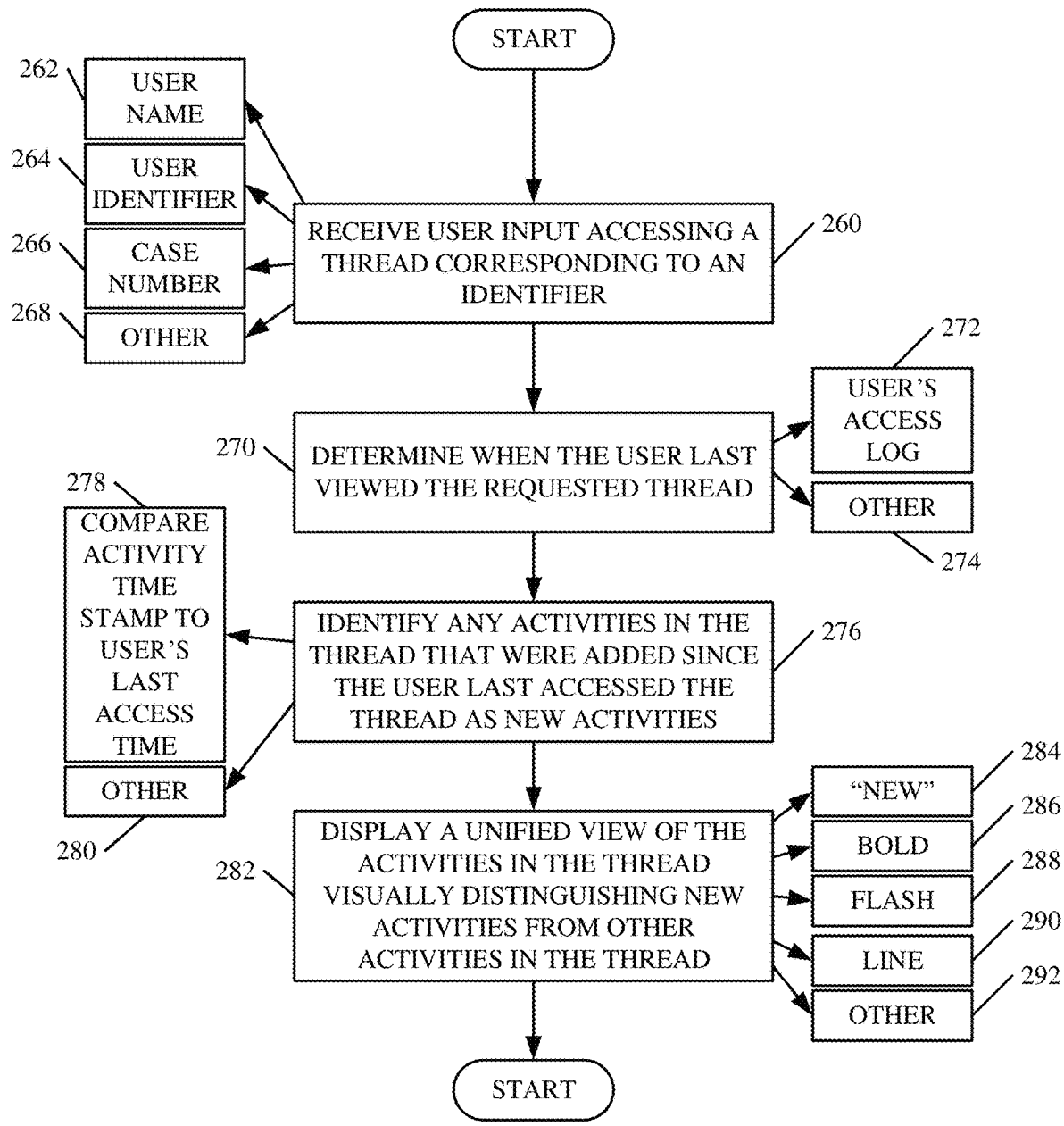
FIG. 3 is a flow diagram illustrating one example of the operation of the architecture shown in FIG. 1 in identifying and displaying new activities on the unified activity thread.
Figure 3A:
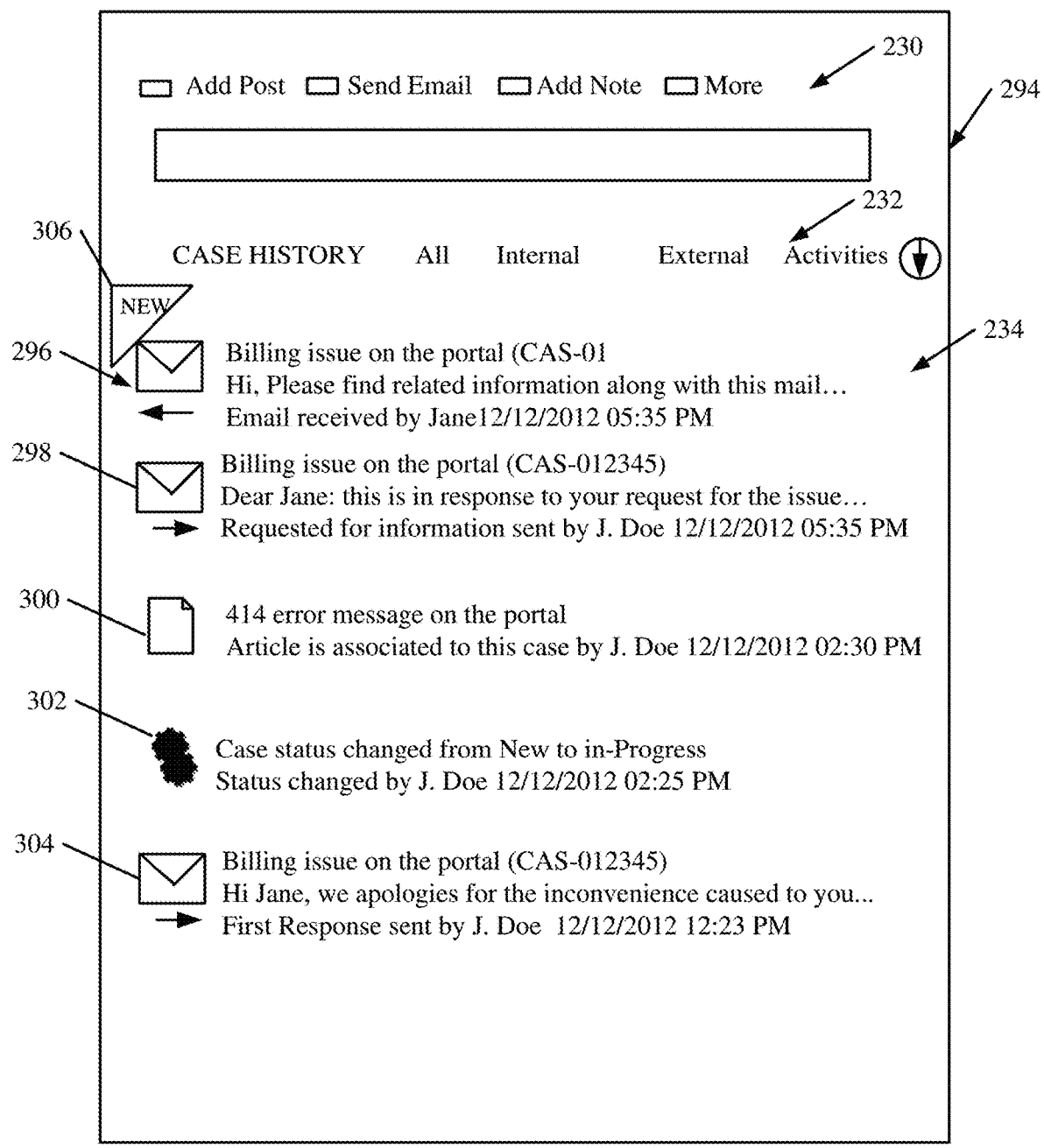
FIG. 3A shows one example of a user interface display.

In one example, new activity processing component 132 (shown in FIG. 1) identifies new activities on the unified display 226 for the given user 112-114 who is accessing the unified display. For example, new activity identifier 180 identifies those activities in the unified thread that have been added to the thread since this particular user last logged on and accessed the unified thread corresponding to this business record. Visual indicia component 182 visually distinguishes the new activities from those that the user has already seen. FIG. 3 is a flow diagram illustrating one example of the operation of new activity processing component 132 in doing this. FIG. 3A shows one example of a user interface display. FIGS. 3 and 3A will now be described in conjunction with one another.

System 102 first receives a user input from a user (such as a user 112) indicating that the user wishes to access a thread corresponding to an identifier (such as a case number, a customer name, etc.). This can be done by having user 112 log into system 102 using authentication information and then by providing the identifier so that user 112 can view the corresponding unified thread. Receiving a user input to access a thread corresponding to an identifier is indicated by block 260 in FIG. 3. As briefly mentioned above, the identifier can be the user name 262, some other user identification number or unique identifier 264, a case number 266, or another identifier 268.

In response, new activity identifier 180 determines when this user 112 last viewed the requested thread. This is indicated by block 270 in FIG. 3. This can be done in a variety of different ways as well. For instance, new activity identifier 180 can review the user's access log to determine when the user last logged on to the system and requested access to this thread. The information can also indicate when the user last exited the thread. Examining the user's access log is indicated by block 272. The new activity identifier 180 can determine when the user last viewed this thread in other ways as well and this is indicated by block 274.

Once new activity identifier 180 has identified when this user last viewed this thread, it examines the activities on the unified display, and, in one example, the timestamp for each activity, to determine whether any of the activities in the thread were added since the user last accessed the thread. If so, it identifies those activities as new activities. This is indicated by block 276 in FIG. 3. It can do this, for instance, by comparing the time that the user last viewed the thread with the timestamp on each activity. This is indicated by block 278. It can do this in other ways as well, as indicated by block 280.

Once the new activity identifier 180 has identified any new activities, visual indicia component 182 then adds visual indicia that distinguish the new activities in the unified display from the old activities (which the user has already seen). It then generates a display of the unified display visually distinguishing new activities from other activities in the thread. This is indicated by block 282. It will be noted, of course, that the visual distinction can be made by using a wide variety of different types of visual indicia. For instance, each new activity can include the word "new". This is indicated by block 284. The new activities can be shown in a different color or in bold, as indicated by block 286. They can be shown flashing as indicated by block 288. The display can include a demarcation line that shows all new activities above the line and all old activities below the line in the display, or vice versa. A demarcation line is indicated by block 290. It can visually distinguish the new activities from the old ones in other ways as well, and this is indicated by block 292.

FIG. 3A shows one example of a unified display 294. It can be seen that some of the items in display 294 are similar to those shown in display 226 illustrated in FIG. 2A, and they are similarly numbered. The threaded display portion 234 in FIG. 3A includes display elements representing activities 296-304. It can be seen that the e-mail activity corresponding to display element 296 is displayed at the top of the thread. It also includes visual indicia generally shown at 306 that identifies the corresponding activity as a new activity. This means that it has been added to the unified thread since this user last viewed this unified display (or thread). Thus, the user 112 can quickly identify relevant information. This reduces the overall processing load on system 102, because user 112 does not need to conduct any type of searching or filtering steps to identify any new activities in the unified thread. It also enables user 112 to use the system more efficiently.

Figure 4:
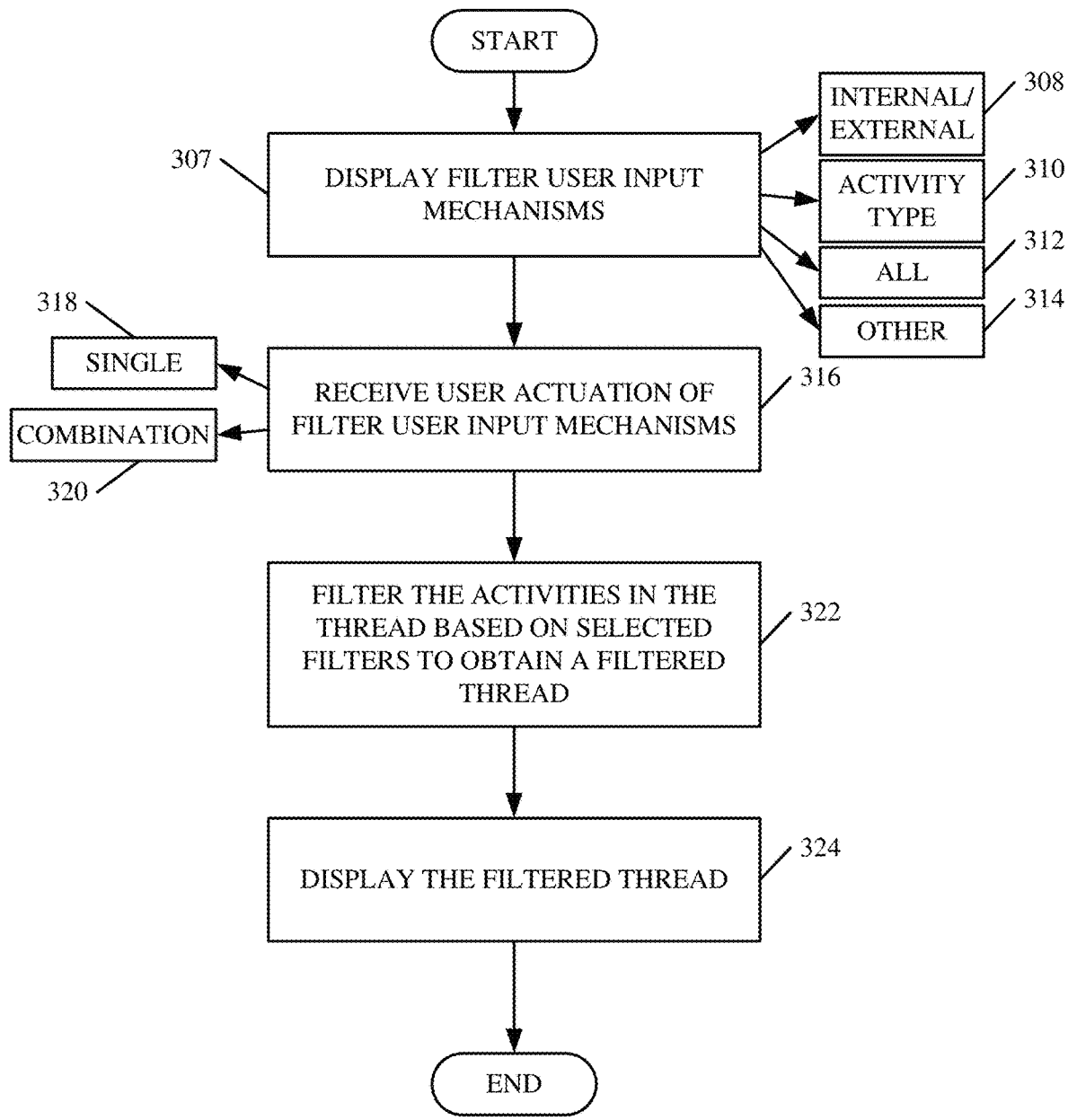
FIG. 4 is a flow diagram illustrating one example of the operation of the architecture shown in FIG. 1 in filtering information displayed on the unified display.
Figure 4A:
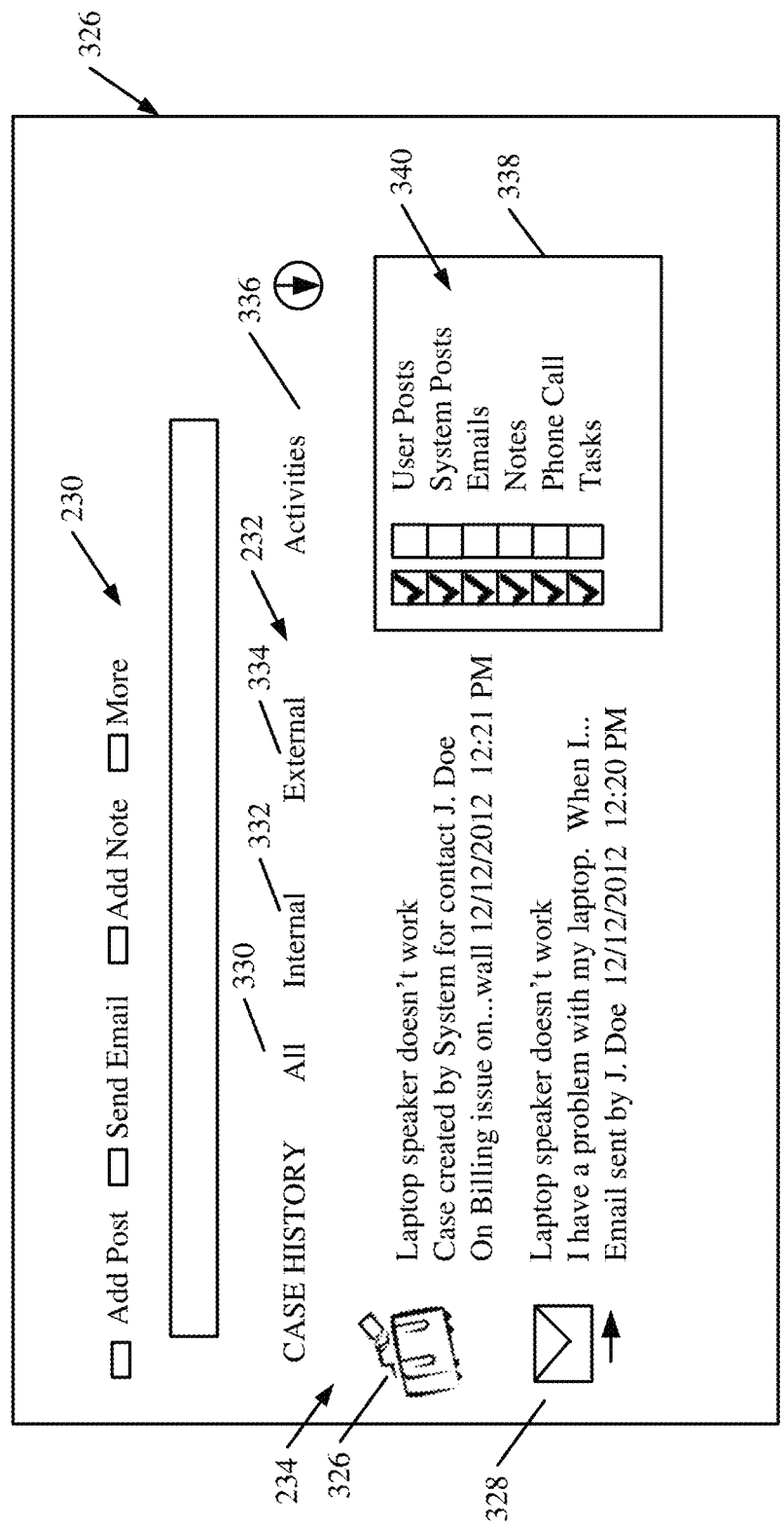
FIG. 4A shows one example of a user interface display.

FIG. 4 is a flow diagram illustrating one example of the operation of activity filter components 170 (shown in FIG. 1) in filtering the activities that are displayed in a given unified thread. FIG. 4A is one example of a user interface display that illustrates this. FIGS. 4 and 4A will now be described in conjunction with one another.

It is first assumed that the user has provided inputs to access a unified display for a given identifier. Activity filter components 170 illustratively display filter user input mechanisms that allow the user to filter the activities displayed in the unified thread. Displaying the filter user input mechanisms is indicated by block 307 in FIG. 4. In one example, the filter user input mechanisms allow the user to filter the activities based on those which were performed internally, versus those which were performed or sent externally. For instance, it may be that there are internal posts or messages that were not seen by a customer. It may also be that there are external e-mails that went to the customer. Filtering based on internal or external activities is indicated by block 308. Also, in one example, the system provides filter user input mechanisms that allow the user to filter based on activity type. This is indicated by block 310. By way of example, it may be that a user only wishes to see e-mail activity and appointments. The user can thus actuate the suitable filter user input mechanisms to have only those activities displayed.

In another example, the user input mechanisms allow the user to quickly see all activities as indicated by block 312. They can include a wide variety of other filter user input mechanisms as well, and this is indicated by block 314.

As mentioned earlier, these are only examples of different filter criteria that can be used. A wide variety of other filter criteria can also be used by providing other filter user input mechanisms. Such criteria can include, for example, sensitivity, date, system status, etc.

The user then illustratively actuates one of the filter user input mechanisms. This is indicated by block 316. The user can actuate a single user input mechanism to filter based on a single set of filter criteria. This is indicated by block 318. In another example, the user can actuate a combination of different filter user input mechanisms to filter based upon a combination of filter criteria. This is indicated by block 320.

Once the user has actuated the user filter user input mechanisms, filters 174 (shown in FIG. 1) filter the activities in the unified thread based on the selected filter user input mechanisms to obtain a filtered thread of activities. This is indicated by block 322. The system then displays the filtered thread so that it contains only those activities that survived the filtering step. This is indicated by block 324.

FIG. 4A shows an example of a user interface display 326. Display 326 is similar, in some ways, to display 294 shown in FIG. 3A, and similar items are similarly numbered. Unified thread portion 234 includes activities 326 and 328. It can be seen that filter portion 232 includes an "All" user input mechanism 330, an "Internal" mechanism 332, an "External" mechanism 334, and an "Activities" mechanism 336. When the user actuates mechanism 330, the system displays all activities in the unified thread. When the user actuates internal mechanism 332, the system displays only those activities that were not available for view by the customer. This would include, for instance, internal e-mails, internal posts, internal notes, internal appointments, internal tasks or meetings, among other things. When the user actuates mechanism 334, the system displays only those items which have been sent to the customer (or which the customer can see). Thus, filter mechanisms 330, 332, and 334 allow the user to quickly and easily filter the list of displayed activities based on certain predefined filter criteria.

Activities mechanism 336 allows the user to filter the displayed activities based on activity type. In doing so, activity type identifier 172 (shown in FIG. 1) identifies each type of activity that may be in the unified thread for this record. When the user actuates mechanism 336, the user can define the particular types of activities that the user wishes to see in the unified list. In the example shown in FIG. 4A, the system generates drop down menu 338. Menu 338 includes a list of all possible activity types 340. The user can select which particular activity types the user wishes to see in the unified thread. In response, the system filters the unified thread to show only those selected activity types.

It will also be noted that, as described above with respect to FIG. 4, the user can provide combinations of filter inputs. For instance, the user can select a plurality of different activity types from list 340. The user can also actuate the internal or external filter mechanisms 332 and 334. When this occurs, the system filters the activities displayed in the unified thread based upon the combination of activity type and internal or external activities. For instance, if the user selects "system posts", "e-mails" and "phone call", then the system will show the unified thread for only system post activities, e-mail activities and phone call activities. If the user then actuates the internal mechanism 332, the system will further filter that list to only those internal system posts, e-mails and phone calls. Of course, the user can filter using other combinations or in different ways as well.

Figure 5:
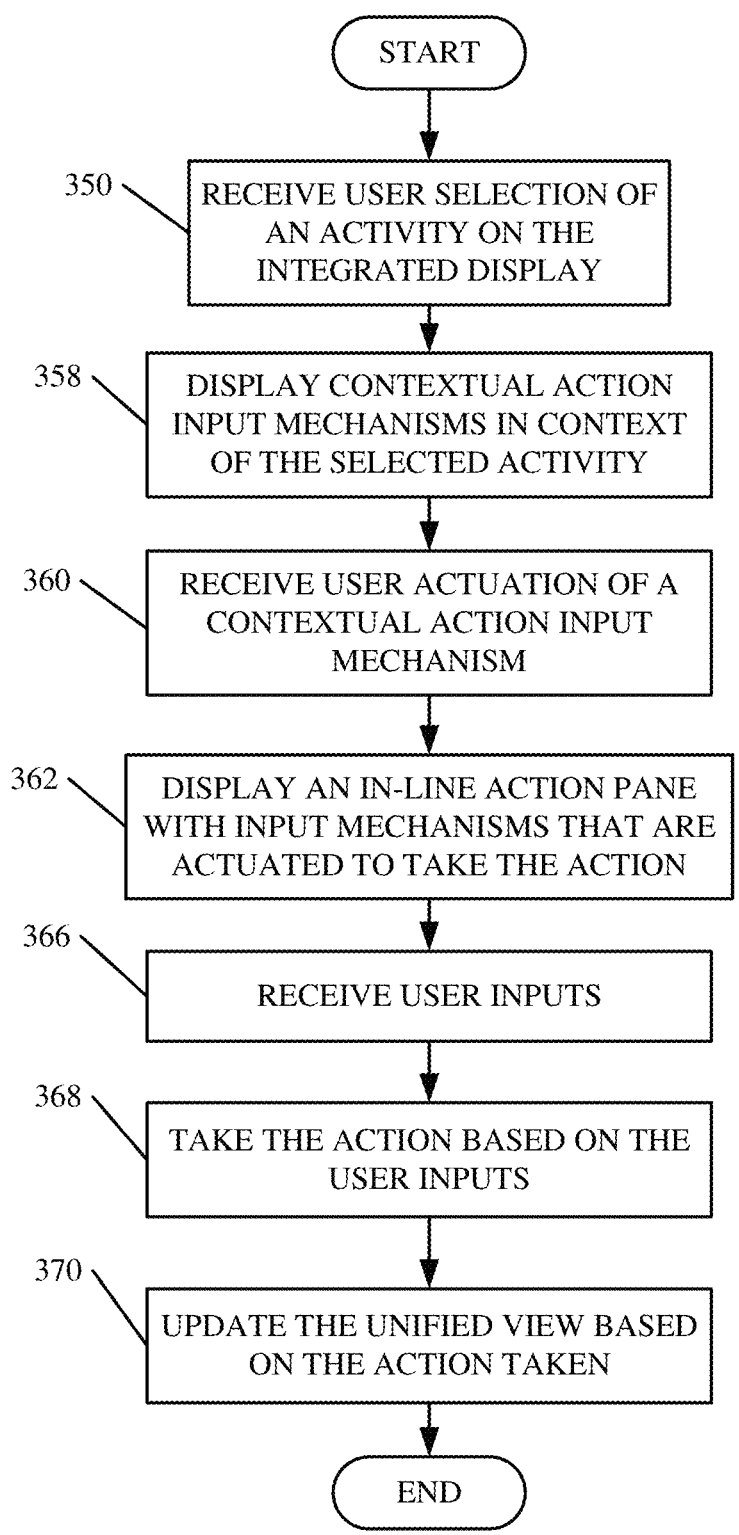
FIG. 5 is a flow diagram illustrating one example of the operation of the architecture shown in FIG. 1 in providing user input mechanisms for taking contextual action from the unified display.
Figure 5A:
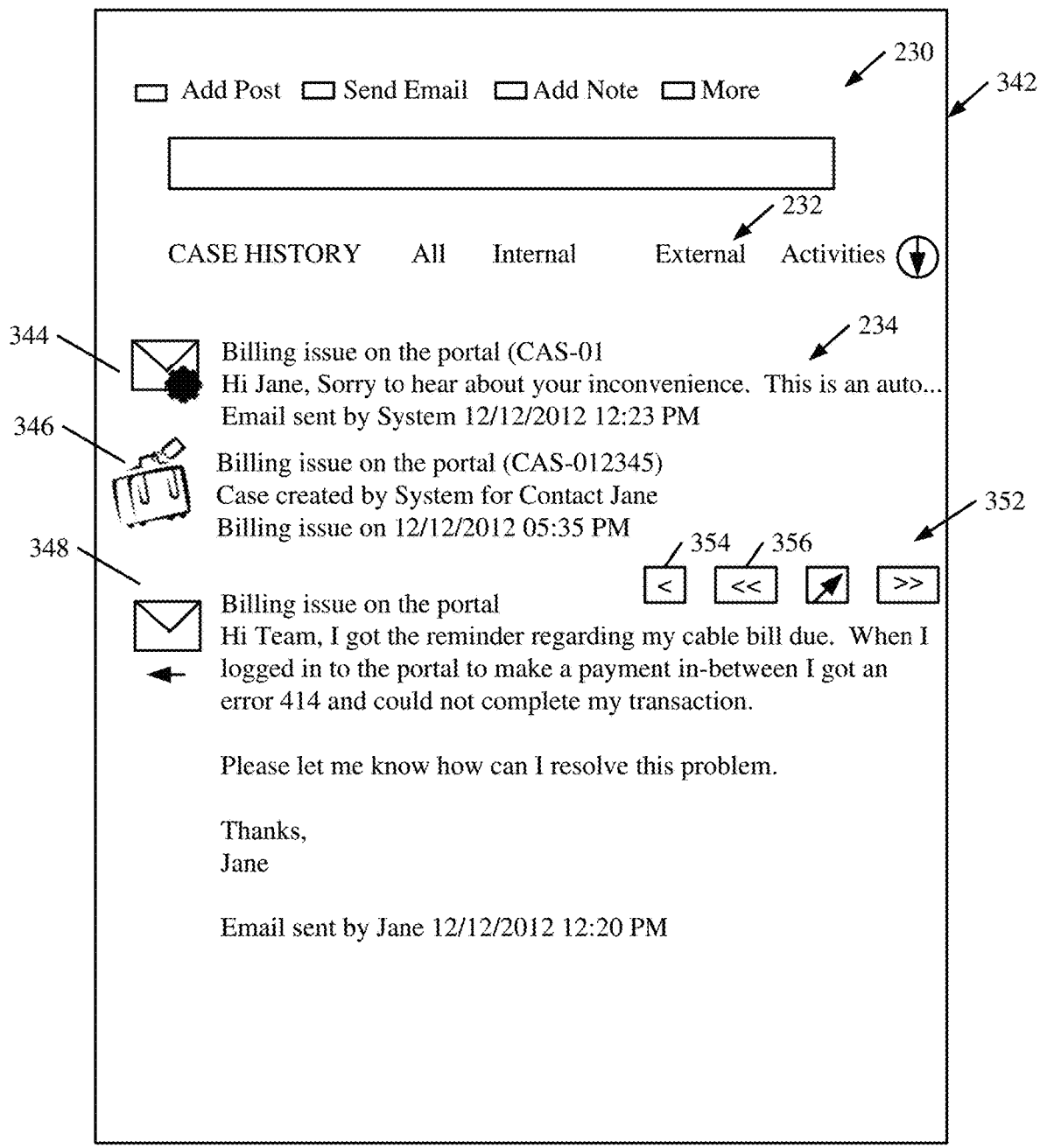
FIGS. 5A-5B are examples of user interface displays.
Figure 5B:
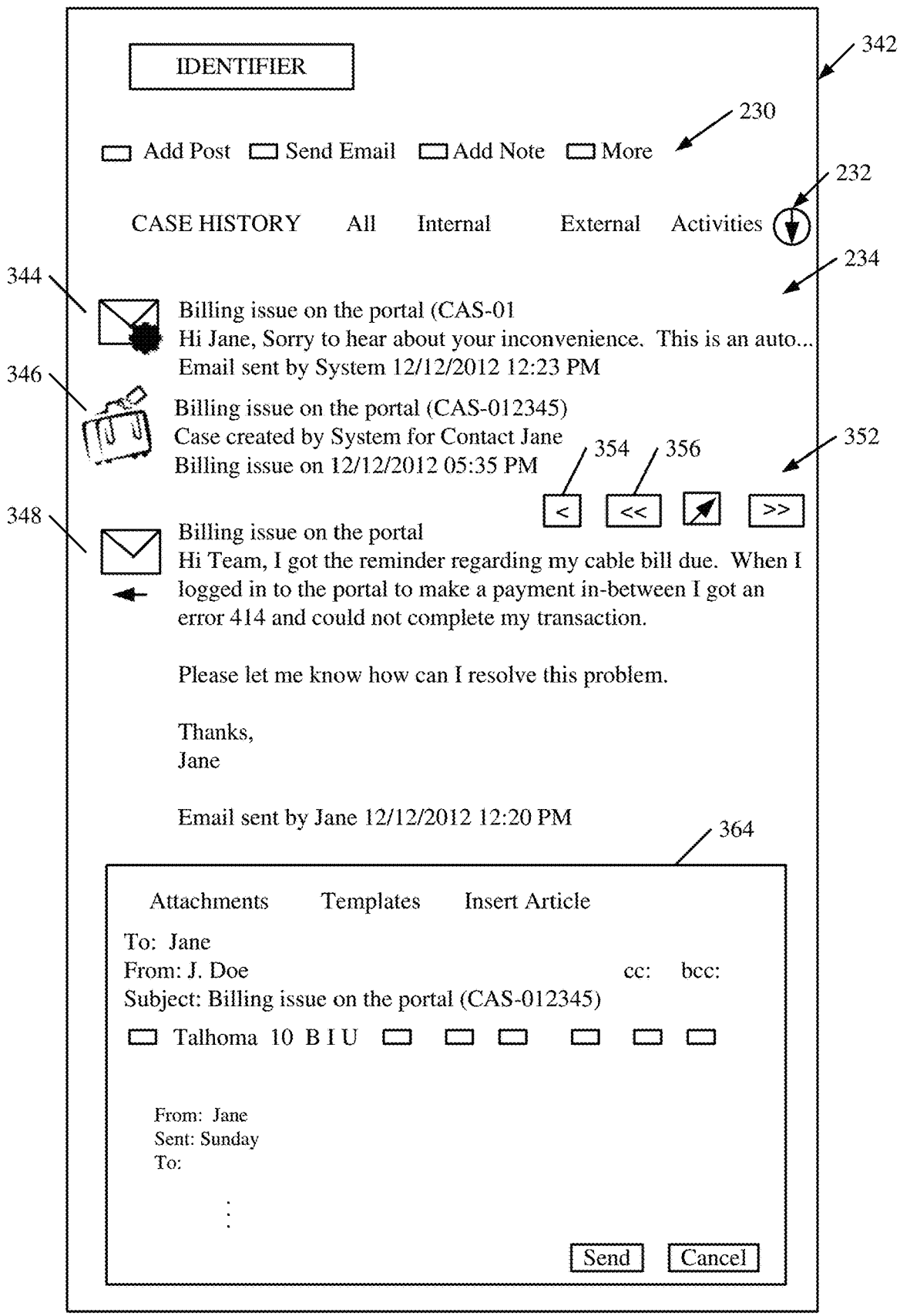

FIG. 5 is a flow diagram illustrating one example of the operation of contextual action processing component 130 (shown in FIG. 1) in generating user interface displays that allow the user to take contextual actions from the unified thread. FIGS. 5A and 5B show examples of user interface displays that indicate this. FIGS. 5-5B will now be described in conjunction with one another.

It is first assumed that the user is already viewing a unified display for a given record (e.g., for a given identifier). FIG. 5A shows one example of a user interface display that indicates this. User interface display 342 is similar, in some ways, to the user interface display 326 shown in FIG. 4A, and similar items are similarly numbered. The unified thread portion 234 includes display elements that represent activities 344, 346 and 348.

The user then selects one of the activities in the unified thread 234. The user can do this, for example, by clicking on one of the display elements that represent the activities with a point and click device, by touching them (on a touch sensitive screen), or in other ways. Receiving user selection of an activity on the unified display is indicated by block 350 in the flow diagram of FIG. 5. It can be seen in FIG. 5A that the user has selected the activity 348. For example, the user may have placed the cursor over the display element representing activity 348 and clicked.

In response, contextual action processing component 130 (shown in FIG. 1) displays a set of contextual action user input mechanisms shown generally at 352 which allow the user to take appropriate actions based upon the particular context of the selected activity. For instance, because the selected activity 348 is an e-mail, the contextual action user input mechanisms that are displayed include a "reply" user input mechanism 354 and a "reply all" user input mechanism 356. If the user had clicked a different activity, then the contextual action user input mechanisms would be those appropriate for taking action from that type of activity. For instance, if the activity were a phone call activity, then the contextual action user input mechanisms may include a user input mechanism that allows the user to redial a previous number, to listen to or record a voicemail message for the other person, etc. Displaying contextual action user input mechanisms that are specific to the context of the selected activity is indicated by block 358 in FIG. 5. In addition to contextual actions, the system can be modified to present the user with custom actions such as "translate email" or "save to pdf", etc.

The user can then actuate one of the contextual action user input mechanisms. This is indicated by block 360. When this occurs, the contextual action processing component 130 displays an in-line action pane with user input mechanisms that can be actuated to take the action represented by the contextual action user input mechanism that the user selected. Displaying the in-line action pane is indicated by block 362 in FIG. 5.

FIG. 5B shows one example of a user interface display that illustrates this. In the example shown in FIG. 5B, the user has actuated the reply user input mechanism 354. In that case, contextual action processing component 130 opens an in-line action pane 364 that allows the user to provide inputs to take the requested action. For instance, the action pane 364 shown in FIG. 5B is an in-line e-mail editor pane that allows the user to generate a reply e-mail. The action pane 364 also illustratively includes all of the contextual user input mechanisms that allow the user to perform the functions that would normally be allowed if the user actually accessed the e-mail system instead of editing an e-mail from an in-line action pane. For instance, where the action pane is for an e-mail activity, it includes mechanisms that allow the user to attach an attachment, to insert items, to use templates, to include more recipients, to CC: the e-mail or blind copy the e-mail to other recipients, to format the e-mail using formatting mechanisms, etc. It also includes a send user input mechanism that allows the user to send the e-mail directly from the in-line editor pane displayed in-line on unified thread 234.

The user can then provide user inputs on the in-line action pane through the contextual user input mechanisms provided thereon. Receiving those user inputs is indicated by block 366 in the flow diagram of FIG. 5. Contextual action processing component 130 then takes the action based on the user inputs. This is indicated by block 368. In one example, contextual action processing component 130 communicates with the particular system or components within business system 102 that are used to take the action. For instance, if the in-line action pane has a user input mechanism that is used to send an e-mail, then component 130 communicates with electronic mail component 158 to generate and send the e-mail based upon the user inputs on the action pane. If the in-line action pane is used to generate and send a message, then contextual action processing component 130 communicates with messaging component 162 to generate and send the message based upon the user inputs. If the in-line action pane is to schedule an appointment or make a telephone call, then contextual action processing component 130 again communicates with the appropriate components in system 102 in order to do that. Of course, if the in-line action pane is to perform some other type of contextual action, then component 130 again communicates with the appropriate components to take that action.

Once the action is taken, in-line unification components 166 update the unified view so that the unified thread of activities includes an item representing the action just taken. For instance, when the user sends the e-mail generated from in-line action pane 364 in FIG. 5B, then the unified thread 234 is updated to include a display element representing an e-mail activity that indicates that the reply e-mail was sent. Updating the unified view based on the action taken is indicated by block 370 in FIG. 5.

It can thus be seen that this provides significant technical advantages. It can reduce the overall processing load on system 102. This is because the user need not continuously switch between the various systems in order to take actions. Instead, the user can take actions directly from the unified thread. This is because the system generates in-line, contextually aware, user input mechanisms so that the user can select an action that is in the appropriate context for the activities in the unified thread. The system then generates an in-line action pane that allows the user to provide other inputs needed to take the specified action. This enables the system to provide an access point to its various components to streamline the processing required for a user to take an action. Thus, these technical advantages improve the operation of business system 102 and of the underlying computing components as well, and also improves user performance and resolution time for customers.

Figure 6:
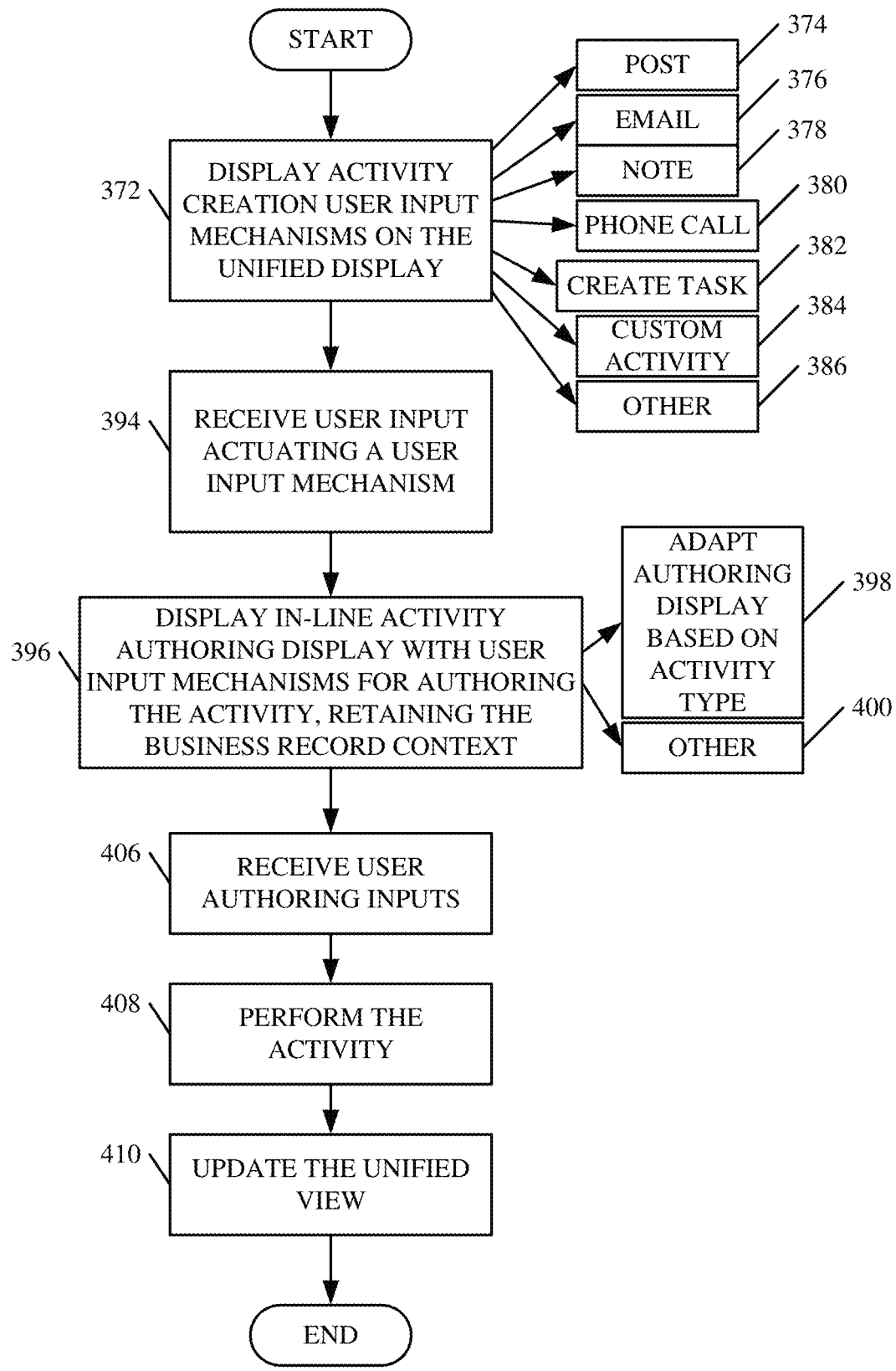
FIG. 6 is a flow diagram illustrating one embodiment of the operation of the architecture shown in FIG. 1 in generating user interface displays with user input mechanisms for creating in-line business activities from the unified display.

FIG. 6 is a flow diagram illustrating one example of the operation of in-line activity creation component 176 in creating new activities directly from the unified display. The operation of in-line activity creation component 176 is distinguished from the contextual action processing component 130 described above with respect to FIGS. 5-5B. While contextual action processing component 130 provides user input mechanisms that allow the user to take contextual actions based on activities that are already in the unified thread, in-line activity creation component 176 provides user input mechanisms that allow the user to create entirely new activities which, once performed, will be added to the unified thread.

Figure 6A:
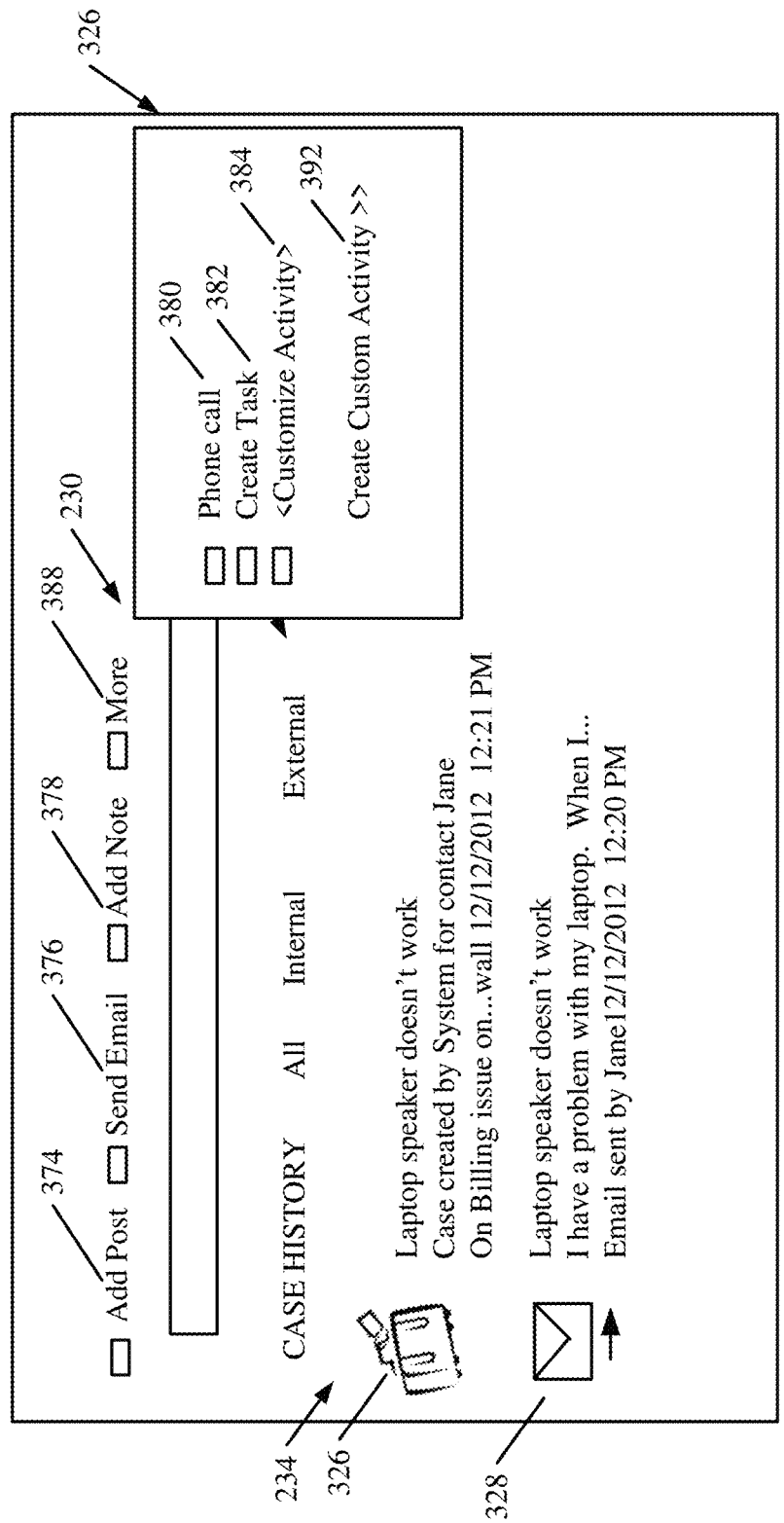
FIGS. 6A-6C show examples of user interface displays.
Figure 6B:
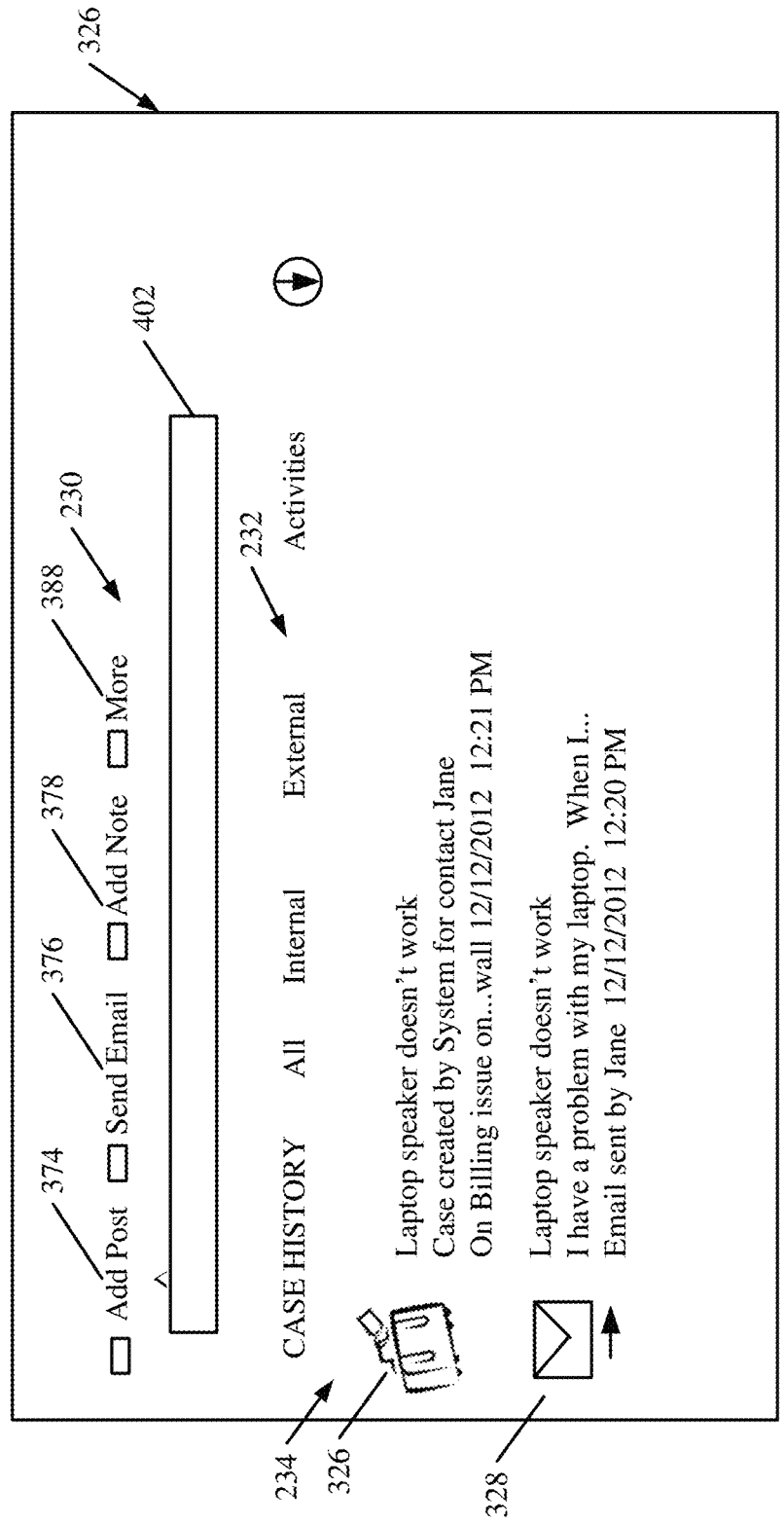
Figure 6C:

FIGS. 6A-6C show examples of user interface displays. FIGS. 6-6C will now be described in conjunction with one another.

It is first assumed that the user is already viewing a unified display. In-line activity creation component 176 includes, in that display, activity creation user input mechanisms. This is indicated by block 372 in FIG. 6. The user input mechanisms can include a post user input mechanism 374, an e-mail user input mechanism 376, a note user input mechanism 378, a phone call user input mechanism 380, a task creation user input mechanism 382, a custom activity user input mechanism 384 and it can include other user input mechanisms corresponding to other activities as well, as indicated by block 386.

FIG. 6A shows one example of user interface display 326 that was shown in FIG. 4A, except that the drop down menu 338 is not displayed. Therefore, similar items to those shown in FIG. 4A are similarly numbered in FIG. 6A. The activity creation user input mechanisms are shown generally at 230. Thus, the "add post" user input mechanism 374 can be actuated by the user to add a post activity to the unified thread. The "send e-mail" user input mechanism 376 can be actuated by the user to create an e-mail activity that will be added to the unified thread. The "add note" user input mechanism 378 can be actuated to add a note to the unified thread. The example shown in FIG. 6A also shows a "more" user input mechanism 388. When the user actuates user input mechanism 388, more activity creation user input mechanisms can be displayed. For instance, in the example shown in FIG. 6A, drop down menu 390 is displayed which contains a list of additional activity creation user input mechanisms. These include a "phone call" mechanism 380 that can be actuated in order to generate a phone call activity. It includes a "create task" user input mechanism 382 that can be actuated to create a task activity and a "custom activity" user input mechanism 384 that can be actuated to create a custom activity. All of the activities, once created or performed, are added to the unified thread. The example shown in FIG. 6A also includes a "create custom activity" user input mechanism 392. When the user actuates this, the user is illustratively navigated through a user experience that allows the user to create a custom activity which can then be selected from the list as well.

The user then illustratively actuates one of the user input mechanisms to create a new activity. This is indicated by block 394 in the flow diagram of FIG. 6. In-line activity creation component 176 then displays an in-line activity authoring display with user input mechanisms for authoring the activity. In doing so, it retains the business record context for the unified display. That is, the user need not navigate to a different screen, or even provide the inputs to generate the new activity from a pop-up menu, which still takes the user out of the context of the unified display. Instead, the authoring display is provided in-line retaining the context of the unified display. This is indicated by block 396 in FIG. 6.

As this is done, the authoring display is adapted based on the activity type. For instance, if the user actuates an e-mail user input mechanism, the authoring display will be an in-line display for creating an e-mail. If the user actuates the create task user input mechanism, the in-line display will be suitable for creating a task, etc. Adapting the authoring display based upon the activity type is indicated by block 398 in FIG. 6. The in-line display, retaining the business record context, can be generated in other ways as well. This is indicated by block 400.

FIG. 6B shows one example of user interface display 326, where the user has actuated the "add post" user input mechanism 374. In one example, a messaging text field 402 is displayed, or becomes active, and the cursor is placed in field 402, so that the user can quickly add a post to the unified thread. It can be seen that this display is generated within the context of the unified thread for this particular business record. The user is not navigated to a different display screen, or even provided with a pop-up display, both of which remove the user from the context of the unified display.

FIG. 6C shows another example of user interface display 326 where the user has actuated the send e-mail user input mechanism 376. It can be seen that in-line activity creation component 176 then generates an in-line e-mail authoring pane 404. The e-mail authoring pane is similar to that shown above with respect to FIG. 5B. However, instead of being a contextual action that is generated from an already-existing activity in the unified display, pane 404 is a new activity that is generated by actuating the "send e-mail" new activity user input mechanism 376.

Regardless of the type of new activity user input mechanism that the user actuates, the in-line activity authoring display is generated with user input mechanisms for authoring the activity, and it retains the context of the unified display. The particular authoring display is adapted based upon the type of activity that is to be created.

Once the in-line activity authoring display is displayed, the user illustratively provides user inputs authoring the particular activity. If the activity is an appointment, the user selects the day and time for the appointment. If it is an e-mail, the user authors the e-mail. If it is a post, the user authors the post, etc. Receiving the user authoring inputs is indicated by block 406 in FIG. 6.

The in-line activity creation component 176 then communicates with the appropriate components in system 102 in order to perform the activity. This is indicated by block 408. By way of example, if the user has authored an e-mail, then component 176 communicates with electronic mail component 158 to create and send the e-mail that was authored. The same is true of the other components and systems within business system 102.

Once the new activity is performed, in-line unification components 168 update the unified view or unified thread to include a display element corresponding to the new activity. Updating the unified thread is indicated by block 410 in FIG. 6.

Again, it can be seen that creating new activities from the unified display provide significant technical advantages. It can reduce the overall processing load on system 102, thereby allowing it to operate more efficiently and quickly. This is because the user need not continuously navigate between the different components or systems within business system 102, in order to generate a new activity. Instead, the user can do so directly from the unified display. Also, because the system maintains the context of the unified display, while the user is authoring the new activity, the system is more quickly and efficiently surfacing relevant information for the user. This also has the effect of improving the performance of business system 102. Other technical advantages, such as those discussed above, can be obtained as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
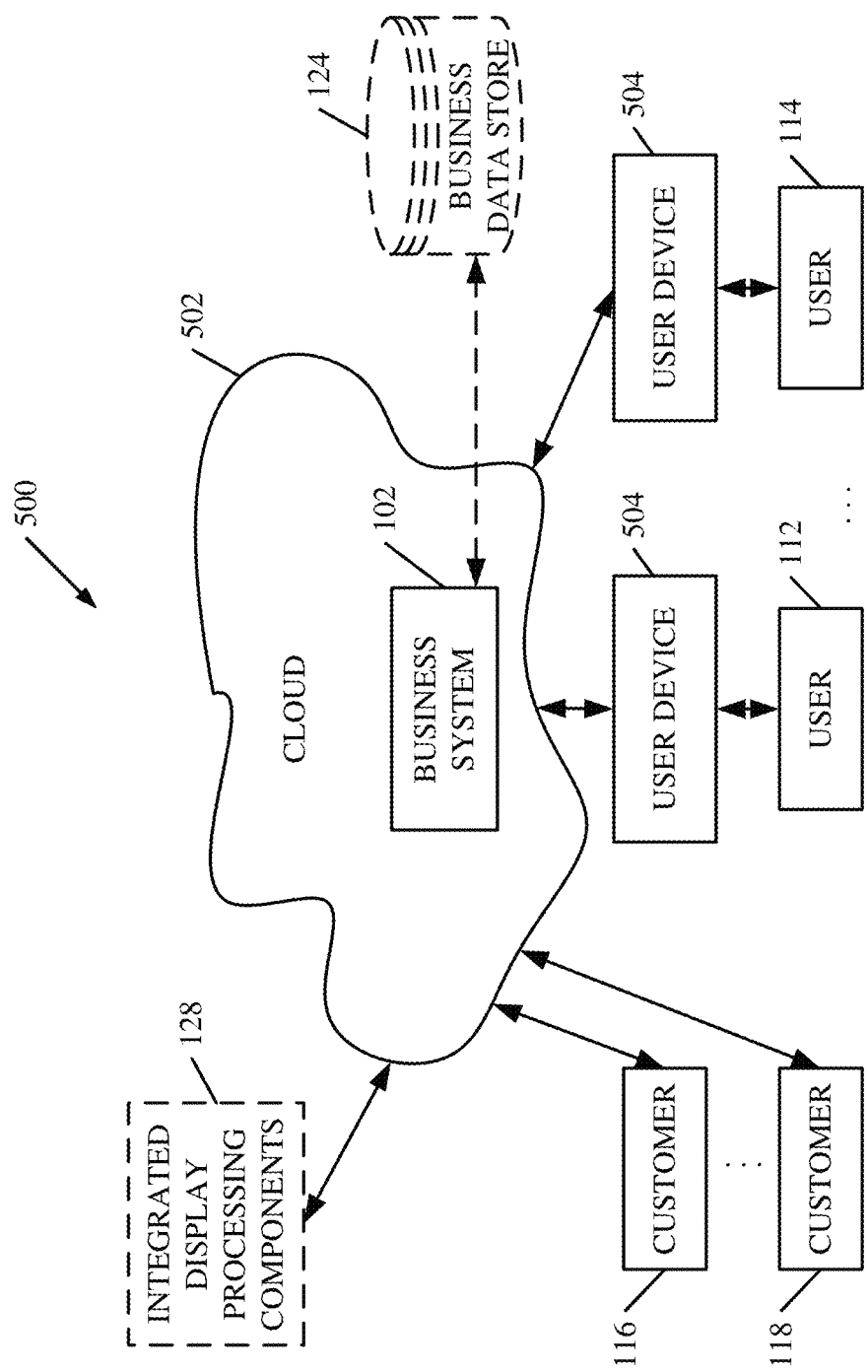
FIG. 7 shows one example of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that business system 102 is located in cloud 502 (which can be public, private, or a combination where portions are public while others are private). Therefore, users 112-114 use user devices 504-506 to access those systems through cloud 502.

FIG. 7 also depicts another example of a cloud architecture. FIG. 7 shows that it is also contemplated that some elements of business system 102 can be disposed in cloud 502 while others are not. By way of example, data store 124 can be disposed outside of cloud 502, and accessed through cloud 502. In another example, integrated display processing component 128 can also be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
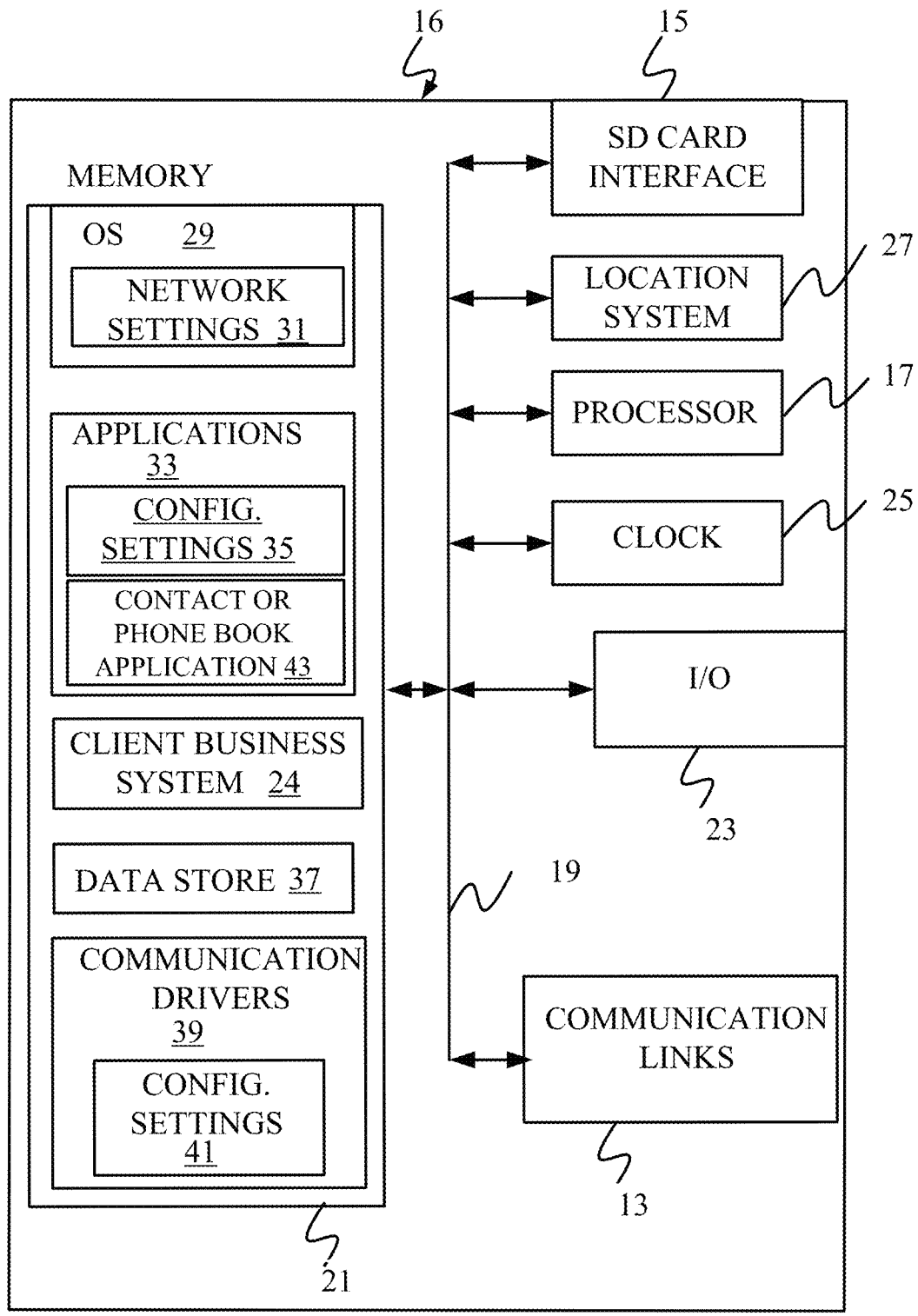
FIGS. 8-10 show examples of mobile devices.
Figure 9:
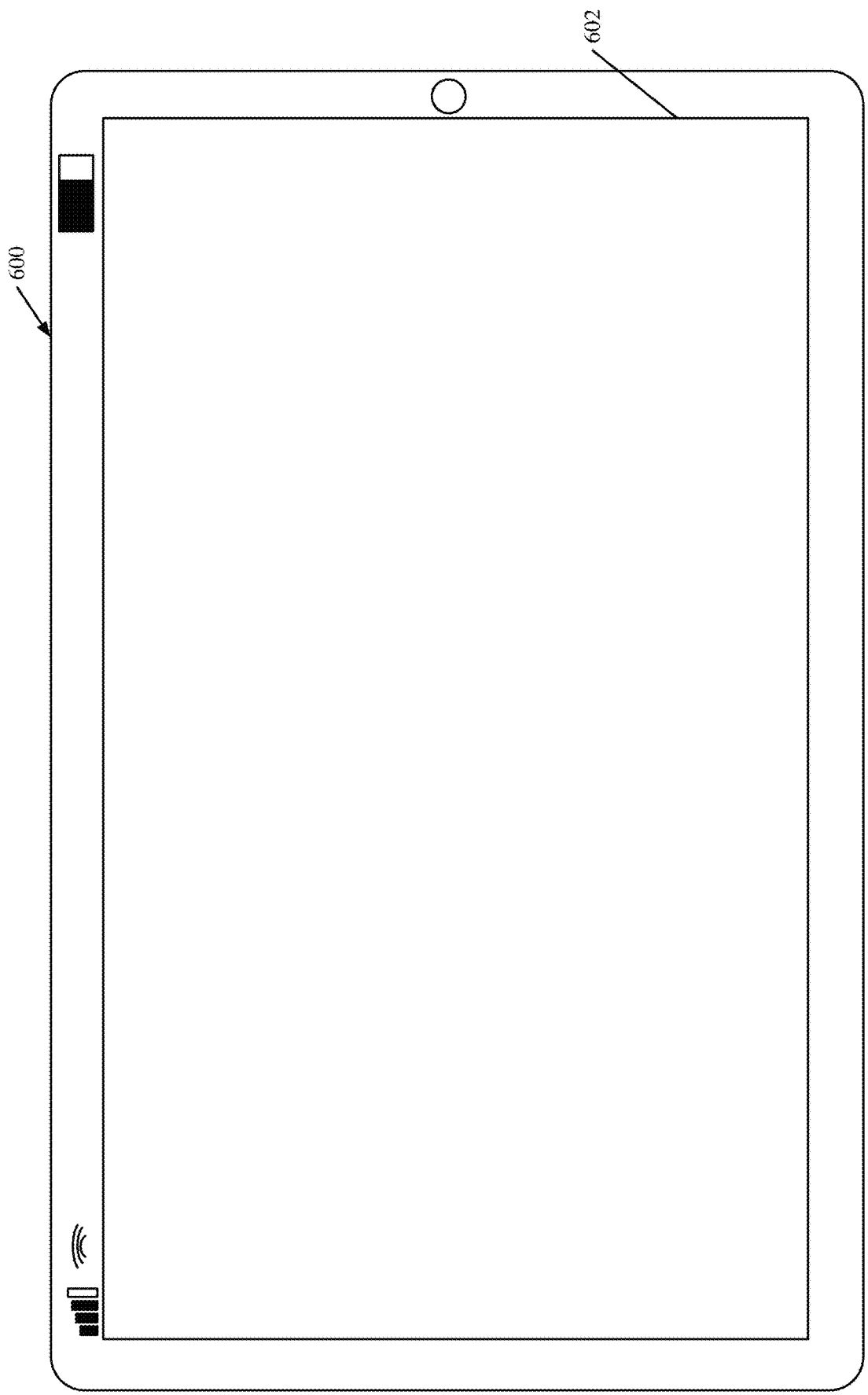
Figure 10:
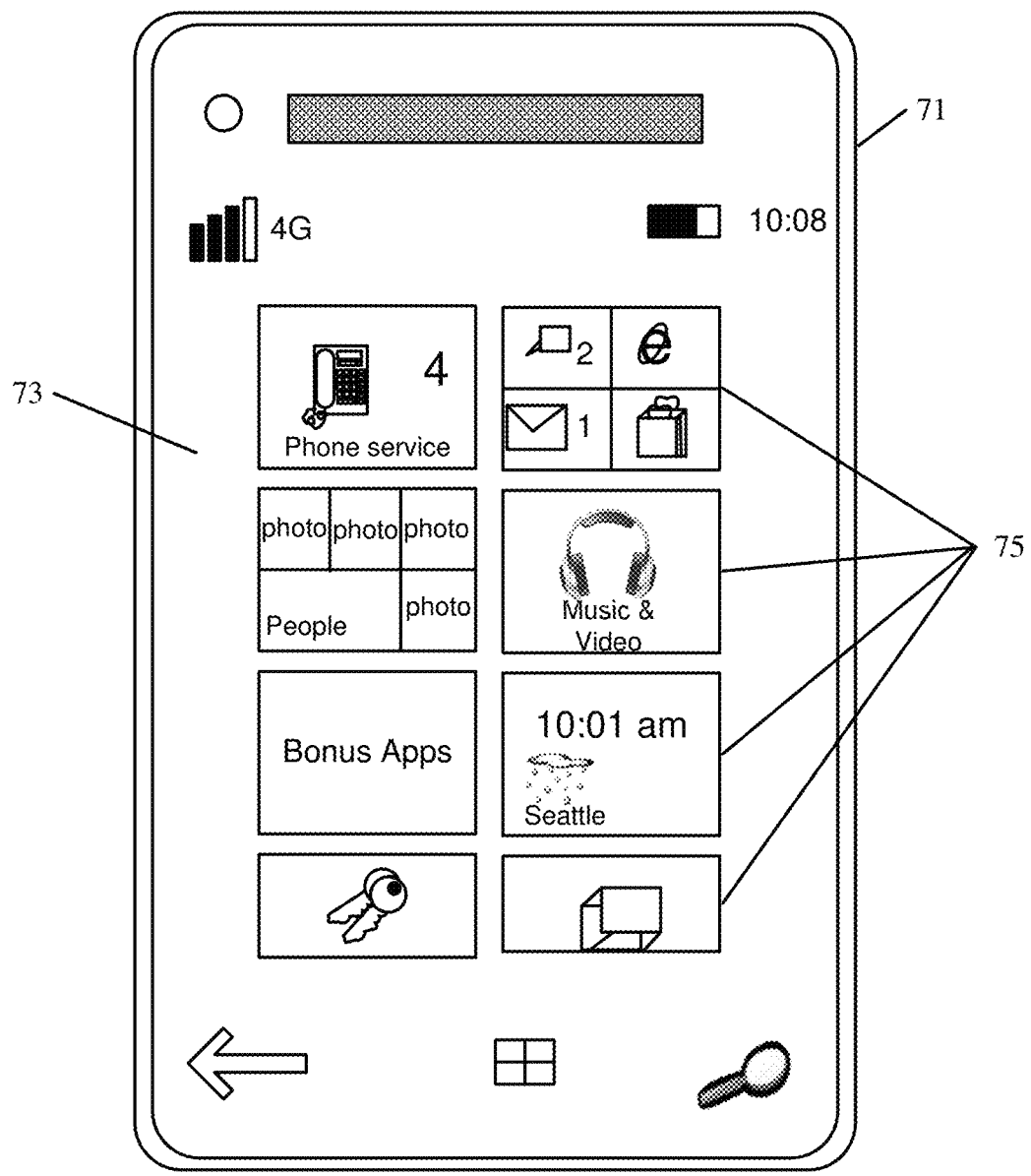

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 122 from FIG. 1 or the processors in devices 504-506) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant (PDA) or a multimedia player or a tablet computing device, etc. (hereinafter referred to as PDA). The PDA can include an inductive screen that senses the position of a stylus 63 (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 is one example of a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
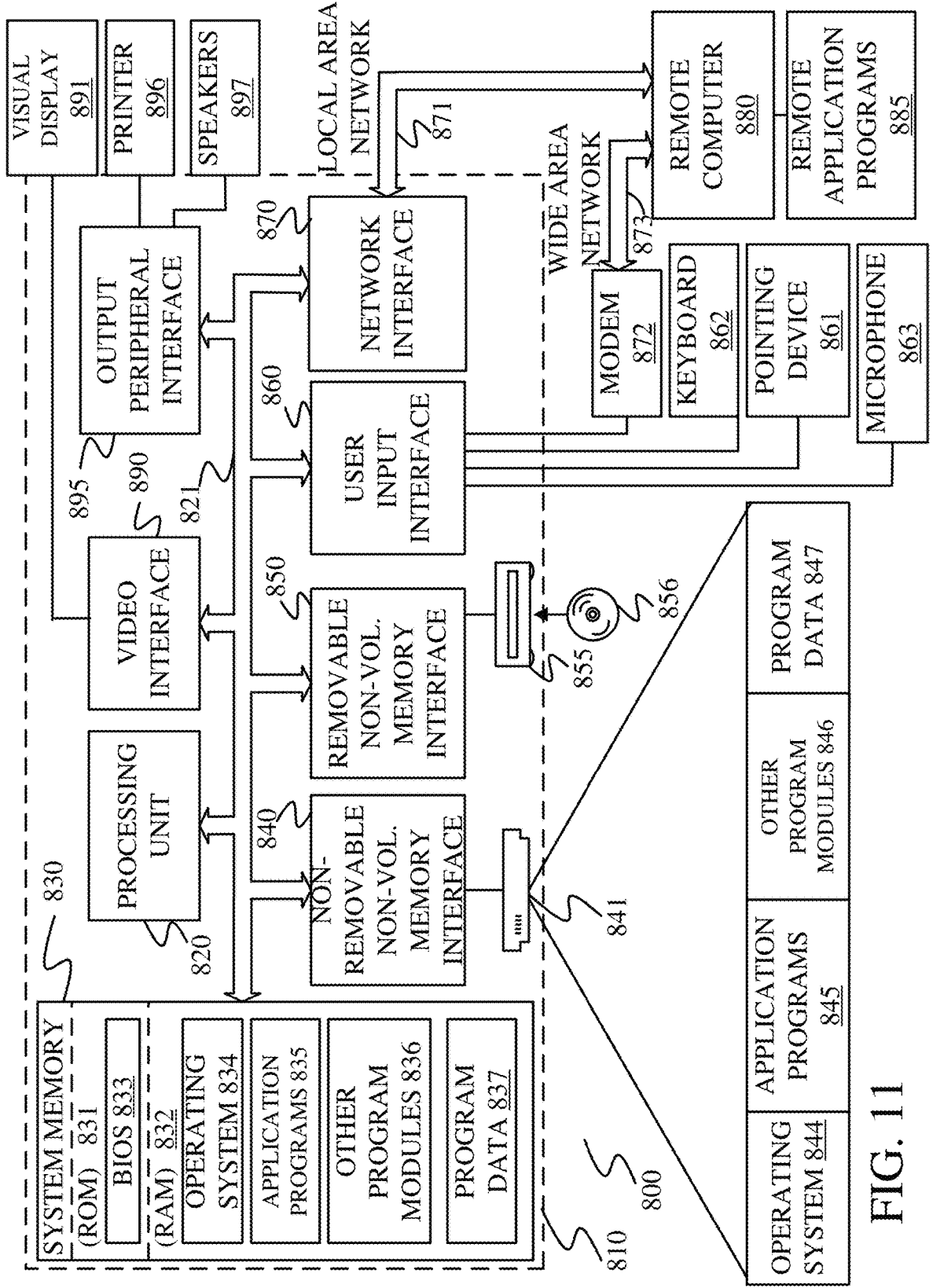
FIG. 11 is a block diagram of one example of a computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 122 or those in devices 504-506), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:

an in-line unification component that identifies activity inputs, indicative of activities of a plurality of different activity types, as corresponding to a common identifier in the computer system;

a thread generation component that generates a thread including display elements, each representing a different identified activity input;

a filter component that generates filter user input mechanisms actuatable to filter the display elements in the thread based on corresponding filter criteria; and a user interface component that displays a unified display corresponding to the common identifier, including the display elements in the thread and the filter user input mechanisms.

Example 2 is the computer system of any or all previous examples wherein the user interface component receives user actuation of a selected one of the filter user input mechanisms, the filter component filters the display elements in the thread, to obtain a filtered set of display elements, based on the filter criteria corresponding to the selected filter user input mechanism.

Example 3 is the computer system of any or all previous examples wherein the user interface display displays the unified display showing only the filtered set of display elements.

Example 4 is the computer system of any or all previous examples wherein computer system comprises a business system that has internal workers and external users, and wherein the activity inputs represent internal activities and external activities, the internal activities being visible in the computer system to only internal workers and the external activities being visible to the external users.

Example 5 is the computer system of any or all previous examples wherein the filter component generates the filter user input mechanisms to include an internal filter mechanism actuatable to filter the display elements in the thread to show only display elements corresponding to internal activities.

Example 6 is the computer system of any or all previous examples wherein the filter component generates the filter user input mechanisms to include an external filter mechanism actuatable to filter the display elements in the thread to show only display elements corresponding to external activities.

Example 7 is the computer system of any or all previous examples wherein the filter component generates the filter user input mechanisms to include activity type filter mechanisms to filter the display elements based on the corresponding activity type.

Example 8 is the computer system of any or all previous examples wherein the activity type filter mechanisms include a plurality of different selectable activity type identifiers that each identify as different activity type, the filter component filtering the display elements to show only display elements in the thread corresponding to an activity type identified by the selected activity type identifiers.

Example 9 is the computer system of any or all previous examples wherein the activity type filter mechanisms include message source filter mechanisms that are actuatable to filter the display elements to show only messages from a selected source.

Example 10 is the computer system of any or all previous examples wherein the activity type filter mechanisms include communication type filter mechanisms that are actuatable to filter the display elements to show only communications of a selected type.

Example 11 is the computer system of any or all previous examples wherein the activity type filter mechanisms include a task filter mechanism that is actuatable to filter the display elements to show only display elements corresponding to task activities in the thread.

Example 12 is a method, comprising:

receiving a user input accessing a thread including display elements, the display elements in the thread representing activity inputs indicative of activities, of a plurality of different activity types, corresponding to a common identifier in a computer system; and displaying a unified display showing the display elements in the thread and filter user input mechanisms that have corresponding filter criteria and that are actuatable to filter the display elements displayed in the thread based on the filter criteria.

Example 13 is the method of claim 12 and further comprising:

receiving user actuation of a given filter user input mechanism;

filtering the display elements in the unified display, based on the filter criteria corresponding to the given filter user input mechanism, to obtain a filtered set of display elements; and displaying the unified display based on the filtered set of display elements.

Example 14 is the method of any or all previous examples and further comprising:

receiving user actuation of a combination of the filter user input mechanisms;

filtering the display elements in the unified display, based on a combination of filter criteria corresponding to the combination of filter user input mechanisms, to obtain a filtered set of display elements; and displaying the unified display based on the filtered set of display elements.

Example 15 is the method of any or all previous examples wherein displaying filter user input mechanisms comprises displaying activity type filter mechanisms that have activity type filter criteria and further comprising:

receiving actuation of a given activity type filter mechanism;

filtering the display elements based on the activity type filter criteria corresponding to the given activity type filter mechanism to obtain a set of filtered display elements; and displaying the unified display based on the set of filtered display elements.

Example 16 is the method of any or all previous examples wherein displaying filter user input mechanisms comprises displaying an internal filter mechanism and further comprising:

receiving actuation of internal filter mechanism;

filtering the display elements, based on whether the corresponding activity input is available to external users, to obtain a set of filtered display elements; and displaying the unified display based on the set of filtered display elements.

Example 17 is the method of any or all previous examples wherein displaying filter user input mechanisms comprises displaying an external filter mechanism and further comprising:

receiving actuation of external filter mechanism;

filtering the display elements, based on whether the corresponding activity input is available to external users, to obtain a set of filtered display elements; and displaying the unified display based on the filtered set of display elements.

Example 18 is a computer readable storage medium that stores computer executable instructions which, when executed by a computer, cause the computer to perform a method, comprising:

receiving a user input accessing a thread including display elements, the display elements in the thread representing activity inputs indicative of activities, of a plurality of different activity types, corresponding to a common identifier in a computer system;

displaying a unified display showing the display elements in the thread and filter user input mechanisms that have corresponding filter criteria and that are actuatable to filter the display elements displayed in the thread based on the filter criteria;

receiving user actuation of a given filter user input mechanism; and displaying the unified display based on the filtered set of display elements.

Example 19 is the computer readable storage medium of any or all previous examples wherein displaying filter user input mechanisms comprises displaying activity type filter mechanisms that have activity type filter criteria and further comprising:

receiving actuation of a given activity type filter mechanism;

filtering the display elements based on the activity type filter criteria corresponding to the given activity type filter mechanism to obtain a set of filtered display elements; and displaying the unified display based on the set of filtered display elements.

Example 20 is the computer readable storage medium of any or all previous examples wherein displaying filter user input mechanisms comprises displaying internal/external filter mechanisms and further comprising:

receiving actuation of one of the internal/external filter mechanisms;

filtering the display elements, based on whether the corresponding activity input is available to external users, to obtain a set of filtered display elements; and displaying the unified display based on the set of filtered display elements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
a processor; and
memory storing instructions executable by the processor, wherein the instructions configure the computer system to:
identify a set of usernames associated with a common identifier in the computer system;
receive a plurality of communications of different communication types of the different communation types, wherein each communication type of the different communication types corresponds to a different communication protocol for communication transmission;
compare a sender of each communication, in the plurality of communications, to the set of usernames;
based on the comparison, identify one or more internal communications having a sender corresponding to a username in the set of usernames and identify one or more external communications that do not have a sender corresponding to a username in the set of usernames;
generate a thread including the plurality of communications of different communication types, wherein
each communication of the different communication types in the thread includes a recipient corresponding to the common identifier, and
the plurality of communications in the thread includes the one or more internal communications and the one or more external communications;
generate a unified display including:
a first plurality of communication display elements representing the plurality of communications of the different communication types in the thread including at least the one or more internal communications and the one or more external communications:
a plurality of contextual action user input mechanisms that corresponds to the plurality of communications of the different communication types, wherein each respective contextual action user input mechanism of the plurality of contextual action user input mechanisms is associated with a corresponding communication of the plurality of communications and is actuatable to perform a corresponding action, represented by the respective contextual action user input mechanism, in-line within the context of the unified display; and a filter user input mechanism;

based on an indication of actuation of a particular contextual action user input mechanism of the plurality of contextual action user input mechanisms, perform the corresponding action, represented by the particular contextual action user input mechanism, in-line within the context of the unified display;

based on an indication of actuation of the filter user input mechanism on the unified display, filter the plurality of communications in the thread into a subset of communications of different communication types by removing, from the plurality of communications represented in the unified display, the one or more external communications, wherein the subset of communications comprises the one or more internal communications; and generate a filtered unified display that includes a second plurality of communication display elements, each communication display element of the second plurality of communication display elements representing at least one of the communications in the subset of communications.

2. The computer system of claim 1 wherein
the plurality of communications includes one or more of: electronic messages or voice calls, and
the instructions configure the computer system to:
based on filter criterion corresponding to the filter user input mechanism, filter the first plurality of communication display elements to obtain a filtered set of communication display elements.

3. The computer system of claim 2 wherein the filtered unified display includes only internal communications in thread.

4. The computer system of claim 2 wherein the instructions configure the computer system to:
store the set of usernames in a data store associated with the computer system, each username of the set of usernames being associated with a particular user and indicating whether the particular user is an internal user or an external user, wherein the internal communications are visible in the computer system to only internal users and the external communications are visible to the external users.

5. The computer system of claim 1 wherein the instructions configure the computer system to:
generate the unified display with a plurality of filter user input mechanisms, including an internal filter mechanism and an external filter mechanism.

6. The computer system of claim 5 wherein the instructions configure the computer system to:
based on an indication of actuation of the external filter mechanism, filter the first plurality of communication display elements in the thread to show only communication display elements corresponding to external communications.

7. The computer system of claim 1 wherein the instructions configure the computer system to:

generate the unified display with an activity type filter user input mechanism; and based on an indication of actuation of the activity type filter user input mechanism, identify a communication type and filter the first plurality of communication display elements based on the communication type.

8. The computer system of claim 1 wherein the instructions configure the computer system to:
generate the unified display with a plurality of communication type filter mechanisms, each communication type filter mechanism of the plurality of communication type filter mechanisms identifying a different communication type, and
based on an indication of actuation of a particular communication type filter mechanism of the plurality of communication type filter mechanisms, filter the first plurality of communication display elements to show only communication display elements in the thread corresponding to the communication type identified by the particular communication type filter mechanism.

9. The computer system of claim 7 wherein the plurality of communication type filter mechanisms include communication source filter mechanisms that are actuatable to filter the first plurality of communication display elements to show only communications from a selected source.

10. The computer system of claim 7 wherein the plurality of communication type filter mechanisms are actuatable to filter the first plurality of communication display elements to show only communications of a selected type.

11. The computer system of claim 7 wherein the plurality of communication type filter mechanisms include a task filter mechanism that is actuatable to filter the first plurality of communication display elements to show only communication display elements corresponding to task activities in the thread.

12. A method performed by a computing system, the method comprising:
identifying a plurality of communications of different communication types, wherein
each communication of the plurality of communications is associated with a common identifier in the computing system, and
each communication type of the different communication types corresponds to a different communication protocol for communication transmission;
identifying a set of usernames associated with the common identifier;
identifying, in the plurality of communications, one or more internal communications having a sender corresponding to a username in the set of usernames, and one or more external communications that do not have a sender corresponding to a username in the set of usernames;
generating a unified display including:
a first plurality of communication display elements representing the plurality of communications in the thread including at least the one or more internal communications and the one or more external communications
a plurality of contextual action user input mechanisms that corresponds to the plurality of communications of the different communication types, wherein each respective contextual action user input mechanism of the plurality of contextual action user input mechanisms is associated with a corresponding communication of the plurality of communications and is actuatable to perform a corresponding action, represented by the respective contextual action user input mechanism, in-line within the context of the unified display, and a filter user input mechanism;

based on an indication of actuation of a particular contextual action user input mechanism of the plurality of contextual action user input mechanisms, performing the corresponding action, represented by the particular contextual action user input mechanism, in-line within the context of the unified display;

based on an indication of actuation of the filter user input mechanism on the unified display, filtering the plurality of communications into a subset of communications by removing, from the plurality of communications represented in the unified display, the one or more external communications, wherein the subset of communications comprises the one or more internal communications; and generating a filtered unified display that includes a second plurality of communication display elements, each communication display element of the second plurality of communication display elements representing at least one of the communications in the subset of communications.

13. The method of claim 12 and further comprising:
generating the unified display with a plurality of filter mechanisms;
receiving an indication of user actuation of a particular filter mechanism of the plurality of filter mechanisms;
based on a filter criterion associated with the particular filter mechanism, filtering the first plurality of communication display elements in the unified display to obtain a filtered set of display elements; and
displaying the filtered unified display based on the filtered set of display elements.

14. The method of claim 12 and further comprising:
receiving user actuation of a combination of the plurality of filter user input mechanisms; and
filtering the first plurality of communication display elements in the unified display, based on a combination of filter criteria corresponding to the combination of the plurality of filter user input mechanisms.

15. The method of claim 12 and further comprising:
displaying a plurality of activity type filter mechanisms, each activity type filter mechanism of the plurality of activity type filter mechanisms corresponding to a different activity type filter criterion;
receiving actuation of a particular activity type filter mechanism of the plurality of activity type filter mechanisms;
filtering the first plurality of communication display elements based on the activity type filter criterion corresponding to the particular activity type filter mechanism to obtain a set of filtered display elements; and
displaying the unified display based on the set of filtered display elements.

16. The method of claim 12 wherein filtering the plurality of communications into a subset of communications comprises:
determining whether each communication of the plurality of communications is available to external users.

17. The method of claim 12 and further comprising:
displaying an external filter mechanism;
receiving an indication of actuation of the external filter mechanism; and filtering the first plurality of communication display elements, based on whether the corresponding communication is available to external users, to obtain a set of filtered display elements.

18. The method of claim 12, wherein filtering the plurality of communications into a subset of communications comprises removing external communications, that are not associated with a username stored in the computing system, from the plurality of communications.

19. The method of claim 12, wherein the subset of communications includes only internal communications.

20. A computer-implemented method comprising:
identifying a set of usernames associated with a common identifier;
receiving a plurality of communications of different communication types, wherein each communication type of the different communication types corresponds to a different communication protocol for communication transmission;
comparing a sender of each communication, in the plurality of communications, to the set of usernames;
based on the comparison, identifying one or more internal communications having a sender corresponding to a username in the set of usernames and identify one or more external communications that do not have a sender corresponding to a username in the set of usernames;
generating a thread including the plurality of communications of different communication types, wherein
each communication of the different communication types in the thread includes a recipient corresponding to the common identifier, and
the plurality of communications in the thread includes the one or more internal communications and the one or more external communications;
generating a unified display including:
a first plurality of communication display elements representing the plurality of communications in the thread including at least the one or more internal communications and the one or more external communications;
a plurality of contextual action user input mechanisms that corresponds to the plurality of communications of the different communication types, wherein each respective contextual action user input mechanism of the plurality of contextual action user input mechanisms is associated with a corresponding communication of the plurality of communications and is actuatable to perform a corresponding action, represented by the respective contextual action user input mechanism, in-line within the context of the unified display; and
a filter user input mechanism;
based on an indication of actuation of a particular contextual action user input mechanism of the plurality of contextual action user input mechanisms, performing the corresponding action, represented by the particular contextual action user input mechanism, in-line within the context of the unified display;
based on an indication of actuation of the filter user input mechanism on the unified display, filtering the plurality of communications in the thread into a subset of communications of different communication types by removing, from the plurality of communications represented in the unified display, the one or more external communications, wherein the subset of communications comprises the one or more internal communications; and generating a filtered unified display that includes a second plurality of communication display elements, each communication display element of the second plurality of communication display elements representing at least one of the communications in the subset of communications.

* * * * *